United States Patent
Kessler et al.

(10) Patent No.: US 11,411,607 B2
(45) Date of Patent: Aug. 9, 2022

(54) AUDIO AND LIGHTING CONTROL VIA A COMMUNICATION BUS

(71) Applicant: Analog Devices, Inc., Wilmington, MA (US)

(72) Inventors: Martin Kessler, Salem, MA (US); Christopher M. Hanna, Arlington, MA (US); Eric M. Cline, Lowell, MA (US)

(73) Assignee: ANALOG DEVICES, INC., Wilmington, MA (US)

(*) Notice: Subject to any disclaimer, the term of this patent is extended or adjusted under 35 U.S.C. 154(b) by 0 days.

(21) Appl. No.: 17/137,152

(22) Filed: Dec. 29, 2020

(65) Prior Publication Data
US 2021/0211156 A1 Jul. 8, 2021

Related U.S. Application Data

(60) Provisional application No. 62/958,258, filed on Jan. 7, 2020.

(51) Int. Cl.
| | |
|---|---|
| *H04B 1/00* | (2006.01) |
| *H04B 3/50* | (2006.01) |
| *H04B 1/7136* | (2011.01) |
| *H04L 25/49* | (2006.01) |
| *H04L 27/00* | (2006.01) |
| *H05B 47/18* | (2020.01) |
| *H05B 45/325* | (2020.01) |
| *B60R 16/023* | (2006.01) |
| *B60Q 9/00* | (2006.01) |
| *H05B 47/12* | (2020.01) |
| *H04R 3/00* | (2006.01) |

(52) U.S. Cl.
CPC ............... *H04B 3/50* (2013.01); *B60Q 9/00* (2013.01); *B60R 16/0231* (2013.01); *H04B 1/7136* (2013.01); *H04L 25/4902* (2013.01); *H04L 27/0002* (2013.01); *H05B 45/325* (2020.01); *H05B 47/12* (2020.01); *H05B 47/18* (2020.01); *H04R 3/005* (2013.01)

(58) Field of Classification Search
CPC ....... H04B 1/00; H04B 3/548; G06F 13/4022; G06F 13/4282; G05B 19/4185
USPC ........................................................ 375/133
See application file for complete search history.

(56) References Cited

U.S. PATENT DOCUMENTS

| | | |
|---|---|---|
| 5,819,051 A | 10/1998 | Murray et al. |
| 7,158,596 B2 | 1/2007 | Knapp et al. |
| 7,272,202 B2 | 9/2007 | Knapp et al. |
| 7,315,551 B2 | 1/2008 | Olson et al. |

(Continued)

FOREIGN PATENT DOCUMENTS

| | | |
|---|---|---|
| CN | 202357955 U | 8/2012 |
| CN | 103419707 A | 12/2013 |

OTHER PUBLICATIONS

ISELED® Protocol-Enabled Microcontrollers, Smart RGB LED Solutions for Automotive Ambient Lighting, Microchip, © 1998-2020, 3 pages.

(Continued)

*Primary Examiner* — Khai Tran

(57) ABSTRACT

Disclosed herein are systems and techniques for audio and lighting control in a bus system. For example, in some embodiments, a bus system may be configured for operation as a light organ and/or to generate sound effects based on accelerometer data.

20 Claims, 13 Drawing Sheets

(56) References Cited

U.S. PATENT DOCUMENTS

| | | |
|---|---|---|
| 7,395,362 B2 | 7/2008 | Drexler et al. |
| 7,539,804 B2 | 5/2009 | Miura |
| 7,599,772 B2 | 10/2009 | Fehr et al. |
| 7,685,449 B2 | 3/2010 | Terasawa |
| 7,707,437 B2 | 4/2010 | Berenbaum et al. |
| 7,802,036 B2 | 9/2010 | Takeuchi |
| 7,966,379 B2 | 6/2011 | Berenbaum et al. |
| 8,147,338 B2 | 4/2012 | Hutchison-Kay |
| 8,156,274 B2 | 4/2012 | Kapelner |
| 8,185,759 B1 | 5/2012 | Li et al. |
| 8,600,583 B2 | 12/2013 | Fervel et al. |
| 8,615,091 B2 | 12/2013 | Terwal |
| 8,667,194 B2 | 3/2014 | Dybsetter et al. |
| 8,745,305 B2 | 6/2014 | Toba et al. |
| 8,786,191 B2 | 7/2014 | Kuang et al. |
| 8,806,083 B2 | 8/2014 | Doorenbos |
| 8,873,659 B2 | 10/2014 | Wang et al. |
| 8,987,933 B2 | 3/2015 | Yu |
| 9,096,168 B2 | 8/2015 | Kuang et al. |
| 9,192,008 B2 * | 11/2015 | Eckel .................... H05B 45/20 |
| 9,434,303 B2 | 9/2016 | Borgholthaus |
| 10,374,583 B1 | 8/2019 | Olejarz et al. |
| 10,649,945 B1 | 5/2020 | Geerling et al. |
| 2002/0043938 A1 | 4/2002 | Lys |
| 2012/0093342 A1 | 4/2012 | Rupprecht et al. |
| 2013/0124763 A1 | 5/2013 | Kessler |
| 2014/0025999 A1 | 1/2014 | Kessler |
| 2014/0095750 A1 | 4/2014 | Tailliet |
| 2014/0101351 A1 | 4/2014 | Hooper et al. |
| 2014/0101477 A1 | 4/2014 | Patterson |
| 2014/0111126 A1 * | 4/2014 | Sankaran .................. H02P 6/34 318/400.09 |
| 2014/0223054 A1 | 8/2014 | Hasan et al. |
| 2014/0281077 A1 | 9/2014 | Biskup |
| 2014/0281078 A1 | 9/2014 | Biskup |
| 2014/0281079 A1 * | 9/2014 | Biskup ................ G06F 11/1423 710/110 |
| 2014/0359122 A1 * | 12/2014 | Hara .................... G10H 1/0066 709/224 |
| 2014/0362865 A1 | 12/2014 | Chini et al. |
| 2015/0008960 A1 | 1/2015 | Lahr |
| 2015/0009050 A1 | 1/2015 | Lahr et al. |
| 2015/0032599 A1 | 1/2015 | Agapitov |
| 2015/0180382 A1 * | 6/2015 | Hamada ................ H02P 27/085 318/722 |
| 2015/0301968 A1 | 10/2015 | Kessler |
| 2015/0365754 A1 | 12/2015 | Perl |
| 2016/0034416 A1 | 2/2016 | Chavez et al. |
| 2016/0034417 A1 | 2/2016 | Chavez et al. |
| 2016/0041941 A1 | 2/2016 | Kessler et al. |
| 2016/0196817 A1 | 7/2016 | Mortensen et al. |
| 2017/0050560 A1 * | 2/2017 | Kuang .................... H05B 45/12 |
| 2017/0150584 A1 | 5/2017 | Motley et al. |
| 2017/0220502 A1 | 8/2017 | Kessler et al. |
| 2017/0222790 A1 | 8/2017 | Hooper et al. |
| 2017/0222829 A1 | 8/2017 | Kessler |
| 2017/0308352 A1 | 10/2017 | Kessler |
| 2018/0060269 A1 | 3/2018 | Kessler |
| 2018/0375738 A1 * | 12/2018 | van der Wel .......... G01R 19/10 |
| 2020/0136858 A1 | 4/2020 | Rotti et al. |
| 2020/0221362 A1 | 7/2020 | Kessler |
| 2020/0356521 A1 | 11/2020 | Kessler et al. |

OTHER PUBLICATIONS

English Translation of CN103419707A (Patent Translate), 8 pages.
English Translation of CN202357955U (Patent Translate), 7 pages.

* cited by examiner

AUDIO AND LIGHTING CONTROL VIA A COMMUNICATION BUS

CROSS-REFERENCE TO RELATED APPLICATION

This application claims priority to U.S. Provisional Patent Application No. 62/958,258, filed Jan. 7, 2020 and titled "AUDIO AND LIGHTING CONTROL VIA A COMMUNICATION BUS," which is incorporated by reference herein in its entirety.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Disclosed herein are systems and techniques for audio and lighting control in a bus system. For example, in some embodiments, a bus system may be configured for operation as a light organ and/or to generate sound effects based on accelerometer data.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality.

Figure 1:
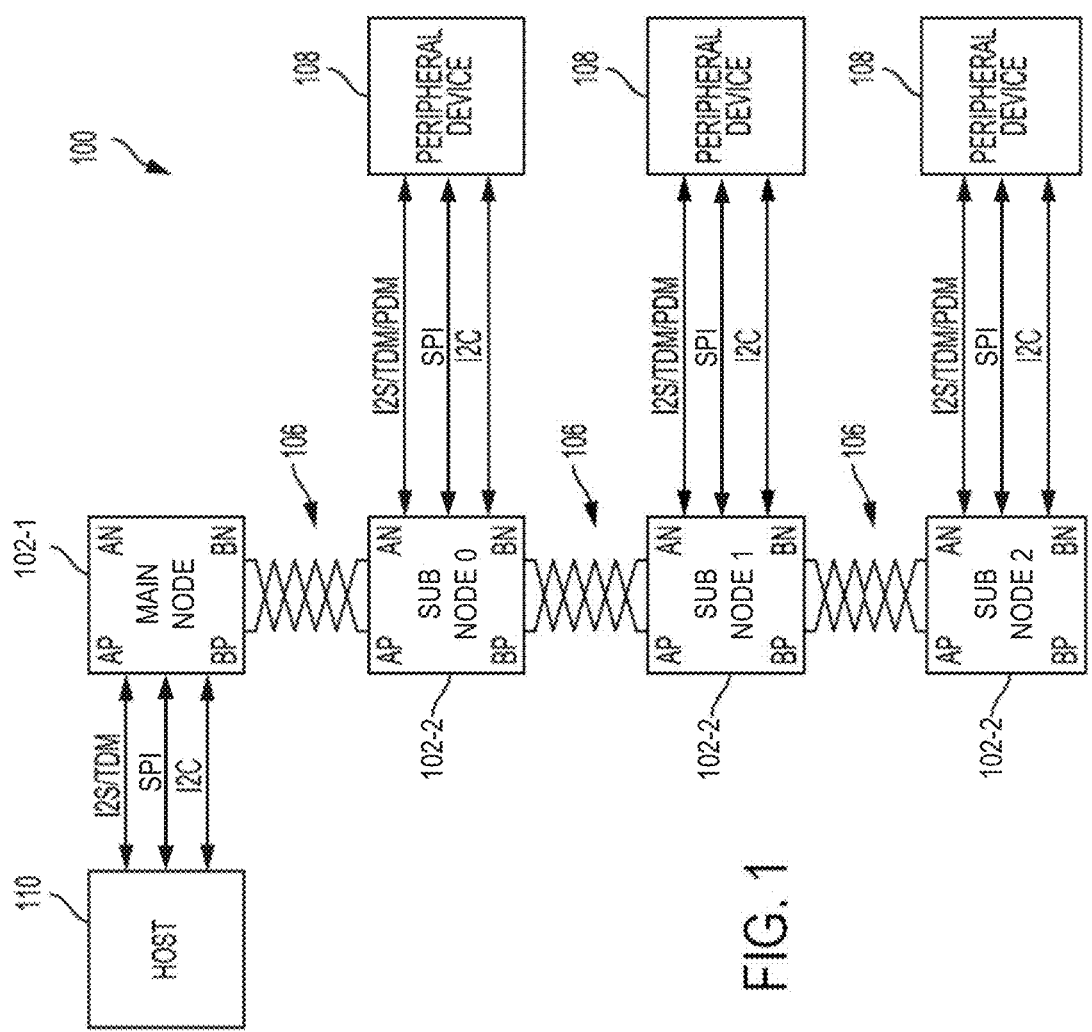
FIG. 1 is a block diagram of an illustrative two-wire communication system, in accordance with various embodiments.

FIG. 1 is a block diagram of an illustrative half-duplex two-wire communication system 100, in accordance with various embodiments. The system 100 includes a host 110, a main node 102-1 and at least one sub node 102-2. In FIG. 1, three sub nodes (0, 1, and 2) are illustrated. The depiction of three sub nodes 102-2 in FIG. 1 is simply illustrative, and the system 100 may include one, two, or more sub nodes 102-2, as desired.

The main node 102-1 may communicate with the sub nodes 102-2 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the main node 102-1 to the sub node 0, a link coupling the sub node 0 to the sub node 1, and a link coupling the sub node 1 to the sub node 2. In some embodiments, the links of the bus 106 may each be formed of a single twisted-wire pair (e.g., an unshielded twisted pair). In some embodiments, the links of the bus 106 may each be formed of a coax cable (e.g., with the core providing the "positive" line and the shield providing the "negative" line, or vice versa). The two-wire bus links together provide a complete electrical path (e.g., a forward and a return current path) so that no additional ground or voltage source lines need be used.

The host 110 may include a processor that programs the main node 102-1, and acts as the originator and recipient of various payloads transmitted along the bus 106. In some embodiments, the host 110 may be or may include a microcontroller, for example. In particular, the host 110 may be the main of Inter-Integrated Circuit Sound (I2S) communications that happen along the bus 106. The host 110 may communicate with the main node 102-1 via an I2S/Time Division Multiplex (TDM) protocol, a Serial Peripheral Interface (SPI) protocol, and/or an Inter-Integrated Circuit (I2C) protocol. In some embodiments, the main node 102-1 may be a transceiver (e.g., the node transceiver 120 discussed below with reference to FIG. 2) located within a same housing as the host 110. The main node 102-1 may be programmable by the host 110 over the I2C bus for configuration and read-back, and may be configured to generate clock, synchronization, and framing for all of the sub nodes 102-2. In some embodiments, an extension of the I2C control bus between the host 110 and the main node 102-1 may be embedded in the data streams transmitted over the bus 106, allowing the host 110 direct access to registers and status information for the one or more sub nodes 102-2, as well as enabling I2C-to-I2C communication over distance to allow the host 110 to control the peripheral devices 108. In some embodiments, an extension of the SPI control bus between the host 110 and the main node 102-1 may be embedded in the data streams transmitted over the bus 106, allowing the host 110 direct access to registers and status information for the one or more sub nodes 102-2, as well as enabling SPI-to-SPI or SPI-to-I2C communication over distance to allow the host 110 to control the peripheral devices 108. In embodiments in which the system 100 is included in a vehicle, the host 110 and/or the main node 102-1 may be included in a headend of the vehicle.

The main node 102-1 may generate "downstream" signals (e.g., data signals, power signals, etc., transmitted away from the main node 102-1 along the bus 106) and receive "upstream" signals (e.g., transmitted toward the main node 102-1 along the bus 106). The main node 102-1 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the main node 102-1 may be derived from an I2S input provided to the main node 102-1 by the host 110. A sub node 102-2 may be an addressable network connection point that represents a possible destination for data frames transmitted downstream on the bus 106 or upstream on the bus 106. A sub node 102-2 may also represent a possible source of downstream or upstream data frames. The system 100 may allow for control information and other data to be transmitted in both directions over the bus 106 from one node to the next. One or more of the sub nodes 102-2 may also be powered by signals transmitted over the bus 106.

In particular, each of the main node 102-1 and the sub nodes 102-2 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the main node 102-1 may include positive and negative upstream terminals, but these terminals may not be used; in other embodiments, the main node 102-1 may not include positive and negative upstream terminals. The last sub node 102-2 along the bus 106 (the sub node 2 in FIG. 1) may include positive and negative downstream terminals, but these terminals may not be used; in other embodiments, the last sub node 102-2 along the bus may not include positive and negative downstream terminals.

As discussed in detail below, the main node 102-1 may periodically send a synchronization control frame downstream, optionally along with data intended for one or more of the sub nodes 102-2. For example, the main node 102-1 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the sub nodes 102-2 to identify the beginning of each superframe and also, in combination with physical layer encoding/signaling, may allow each sub node 102-2 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the sub nodes 102-2), conveyance of I2C information, conveyance of SPI information, remote control of certain general-purpose input/output (GPIO) pins at the sub nodes 102-2, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between sub node 102-2 (optionally along with other data, which may come from the main node 102-1 but additionally or alternatively may come from one or more upstream sub nodes 102-2 or from a sub node 102-2 itself) until it reaches the last sub node 102-2 (i.e., the sub node 2 in FIG. 1), which has been configured by the main node 102-1 as the last sub node 102-2 or has self-identified itself as the last sub node 102-2. Upon receiving the synchronization control frame, the last sub node 102-2 may transmit a synchronization response frame followed by any data that it is permitted to transmit (e.g., a 24-bit audio sample in a designated time slot). The synchronization response frame may be passed upstream between sub nodes 102-2 (optionally along with data from downstream sub nodes 102-2), and based on the synchronization response frame, each sub node 102-2 may be able to identify a time slot, if any, in which the sub node 102-2 is permitted to transmit.

In some embodiments, one or more of the sub nodes 102-2 in the system 100 may be coupled to and communicate with a peripheral device 108. For example, a sub node 102-2 may be configured to read data from and/or write data to the associated peripheral device 108 using I2S, pulse density modulation (PDM), TDM, SPI, and/or I2C protocols, as discussed below. Although the "peripheral device 108" may be referred to in the singular herein, this is simply for ease of discussion, and a single sub node 102-2 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for I2S communication; the peripheral device 108 may communicate with the associated sub node 102-2 via the I2S protocol. In some embodiments, the peripheral device 108 may include any device configured for I2C communication; the peripheral device 108 may communicate with the associated sub node 102-2 via the I2C protocol. In some embodiments, the peripheral device 108 may include any device configured for SPI communication; the peripheral device 108 may communicate with the associated sub node 102-2 via the SPI protocol. In some embodiments, a sub node 102-2 may not be coupled to any peripheral device 108.

A sub node 102-2 and its associated peripheral device 108 may be contained in separate housings and coupled through a wired or wireless communication connection or may be contained in a common housing. For example, a speaker connected as a peripheral device 108 may be packaged with the hardware for an associated sub node 102-2 (e.g., the node transceiver 120 discussed below with reference to FIG. 2), such that the hardware for the associated sub node 102-2 is contained within a housing that includes other speaker components. The same may be true for any type of peripheral device 108.

As discussed above, the host 110 may communicate with and control the main node 102-1 using multi-channel I2S, SPI, and/or I2C communication protocols. For example, the host 110 may transmit data via I2S to a frame buffer (not illustrated) in the main node 102-1, and the main node 102-1 may read data from the frame buffer and transmit the data along the bus 106. Analogously, the main node 102-1 may store data received via the bus 106 in the frame buffer, and then may transmit the data to the host 110 via I2S.

Each sub node 102-2 may have internal control registers that may be configured by communications from the main node 102-1. A number of such registers are discussed in detail below. Each sub node 102-2 may receive downstream data and may retransmit the data further downstream. Each sub node 102-2 may receive and/or generate upstream data and/or retransmit data upstream and/or add data to an upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The main node 102-1 may be programmed (by the host 110) with a number of downstream portions to transmit to one or more of the sub nodes 102-2 and a number of upstream portions to receive from one or more of the sub nodes 102-2. Each sub node 102-2 may be programmed (by the main node 102-1) with a number of downstream portions to retransmit down the bus 106, a number of downstream portions to consume, a number of upstream portions to retransmit up the bus 106, and a number of upstream portions in which the sub node 102-2 may transmit data received from the sub node 102-2 from the associated peripheral device 108. Communication along the bus 106 is discussed in further detail below with reference to FIGS. 2-12.

Embodiments of the communication systems 100 disclosed herein are unique among conventional communication systems in that all sub nodes 102-2 may receive output data over the bus 106 within the same superframe (e.g., all sub nodes 102-2 may receive the same audio sample without sample delays between the nodes 102). In conventional communication systems, data is buffered and processed in each node before being passed downstream in the next frame to the next node. Consequently, in these conventional communication systems, the latency of data transmission depends on the number of nodes (with each node adding a delay of one audio sample). In the communication systems 100 disclosed herein, the bus 106 may only add one cycle of latency, no matter if the first or last sub node 102-2 receives the data. The same is true for upstream communication; data may be available at an upstream node 102 in the next superframe, no matter which sub node 102-2 provided the data.

Further, in embodiments of the communication systems 100 disclosed herein, downstream data (e.g., downstream audio data) may be put on the bus 106 by the main node 102-1 or by any of the sub nodes 102-2 that are upstream of the receiving sub node 102-2; similarly, upstream data (e.g., upstream audio data) may be put on the bus 106 by any of the sub nodes 102-2 that are downstream of the receiving node 102 (i.e., the main node 102-1 or a sub node 102-2). Such capability allows a sub node 102-2 to provide both upstream and downstream data at a specific time (e.g., a specific audio sample time). For audio data, this data can be received in the next audio sample at any downstream or upstream node 102 without further delays (besides minor processing delays that fall within the superframe boundary). As discussed further herein, control messages (e.g., in a synchronization control frame (SCF)) may travel to the last node 102 (addressing a specific node 102 or broadcast) and an upstream response (e.g., in a synchronization response frame (SRF)) may be created by the last downstream node 102 within the same superframe. Nodes 102 that have been addressed by the SCF change the content of the upstream SRF with their own response. Consequently, within the same audio sample, a control and a response may be fully executed over multiple nodes 102. This is also in contrast to conventional communication systems, in which sample latencies would be incurred between nodes (for relaying messages from one node to the other).

Figure 2:
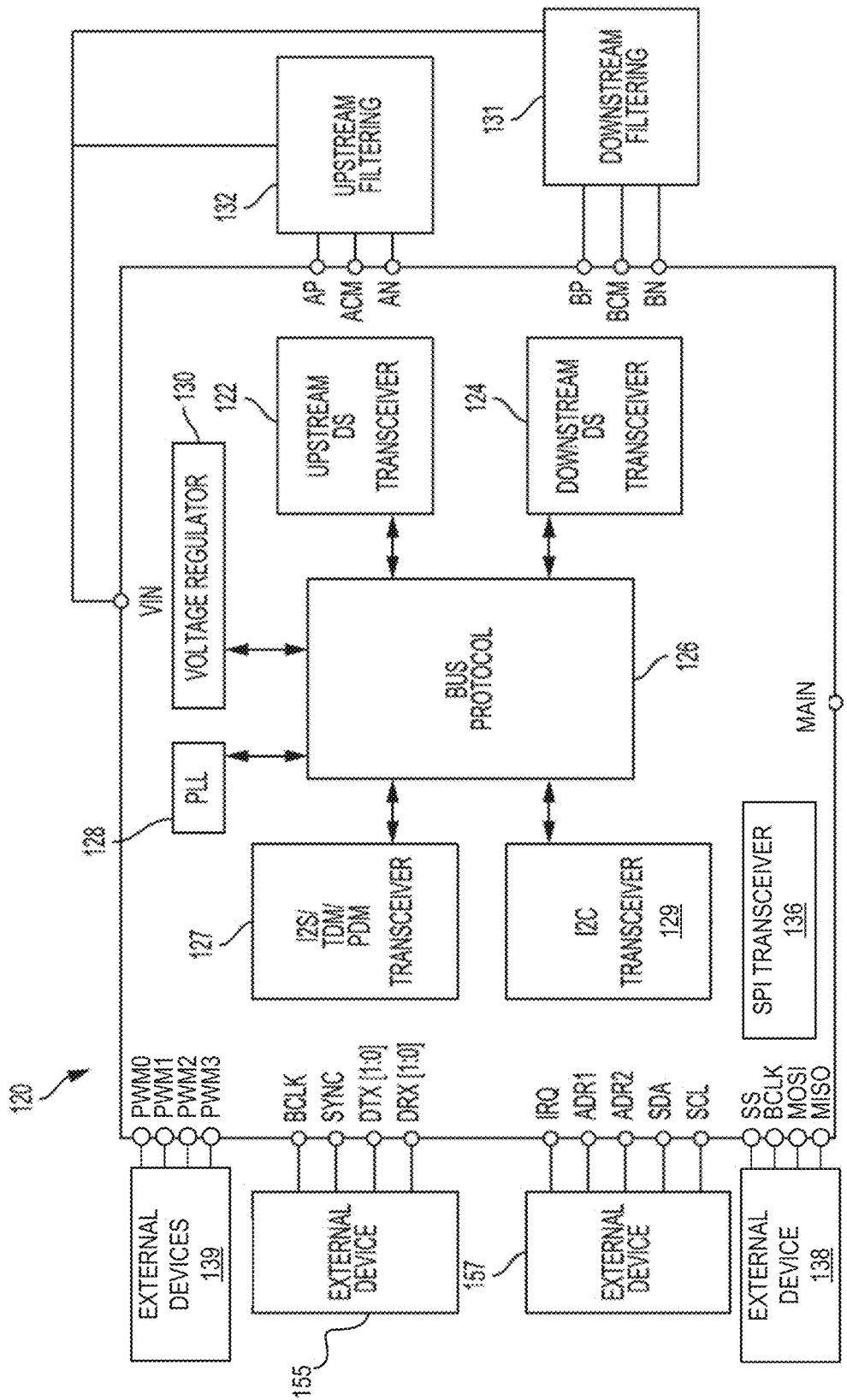
FIG. 2 is a block diagram of a node transceiver that may be included in a node of the system of FIG. 1, in accordance with various embodiments.

Each of the main node 102-1 and the sub nodes 102-2 may include a transceiver to manage communication between components of the system 100. FIG. 2 is a block diagram of a node transceiver 120 that may be included in a node (e.g., the main node 102-1 or a sub node 102-2) of the system 100 of FIG. 1, in accordance with various embodiments. In some embodiments, a node transceiver 120 may be included in each of the nodes of the system 100, and a control signal may be provided to the node transceiver 120 via a main (MAIN) pin to indicate whether the node transceiver 120 is to act as a main (e.g., when the MAIN pin is high) or a sub (e.g., when the MAIN pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the sub nodes 102-2 in the system 100 may receive power transmitted over the bus 106 concurrently with data. For power distribution (which is optional, as some of the sub nodes 102-2 may be configured to have exclusively local power provided to them), the main node 102-1 may place a DC bias on the bus link between the main node 102-1 and the sub node 0 (e.g., by connecting, through a low-pass filter, one of the downstream terminals to a voltage source provided by a voltage regulator and the other downstream terminal to ground). The DC bias may be a predetermined voltage, such as 5 volts, 8 volts, the voltage of a car battery, or a higher voltage. Each successive sub node 102-2 can selectively tap its upstream bus link to recover power (e.g., using the voltage regulator circuitry 130). This power may be used to power the sub node 102-2 itself (and optionally one or more peripheral device 108 coupled to the sub node 102-2). A sub node 102-2 may also selectively bias the bus link downstream for the next-in-line sub node 102-2 with either the recovered power from the upstream bus link or from a local power supply. For example, the sub node 0 may use the DC bias on the upstream bus link 106 to recover power for the sub node 0 itself and/or for one or more associated peripheral device 108, and/or the sub node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the sub node 0 via the bus 106, the main node 102-1 may instruct the sub node 0 to provide power to its downstream bus link 106 in order to provide power to the sub node 1; after the sub node 1 is discovered and configured, the main node 102-1 may instruct the sub node 1 to provide power to its downstream bus link 106 in order to provide power to the sub node 2 (and so on for additional sub nodes 102-2 coupled to the bus 106). In some embodiments, one or more of the sub nodes 102-2 may be locally powered, instead of or in addition to being powered from its upstream bus link. In some such embodiments, the local power source for a given sub node 102-2 may be used to provide power to one or more downstream sub nodes.

In some embodiments, upstream bus interface circuitry 132 may be disposed between the upstream DS transceiver 122 and the voltage regulator circuitry 130, and downstream bus interface circuitry 131 may be disposed between the downstream DS transceiver 124 and the voltage regulator circuitry 130. Since each link of the bus 106 may carry AC (signal) and DC (power) components, the upstream bus interface circuitry 132 and the downstream bus interface circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream bus interface circuitry 132 and the downstream bus interface circuitry 131 may include a ferrite, a common mode choke, or an inductor, for example, to reduce the AC component provided to the voltage regulator circuitry 130. In some embodiments, the upstream bus interface circuitry 132 may be included in the upstream DS transceiver 122, and/or the downstream bus interface circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the main node 102-1, the external device 155 may include the host 110, and the I2S/TDM/PDM transceiver 127 may provide an I2S sub (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a sub node 102-2, the external device 155 may include one or more peripheral devices 108, and the I2S/TDM/PDM transceiver 127 may provide an I2S clock main (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the 120 addresses used by the node transceiver 120 when the node transceiver 120 acts as an I2C sub (e.g., when it is included in the main node 102-1), and SDA and SCL are used for the 120 serial data and serial clock signals, respectively. When the node transceiver 120 is included in the main node 102-1, the external device 157 may include the host 110, and the I2C transceiver 129 may provide an I2C sub that can receive programming instructions from the host 110. In particular, an 120 serial clock signal may be received at the SCL pin as an input from the host 110 for register accesses. When the node transceiver 120 is included in a sub node 102-2, the external device 157 may include a peripheral device 108 and the 120 transceiver 129 may provide an I2C main to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include a transceiver 136 for SPI communication between the node transceiver 120 and an external device 138. Although the "external device 138" may be referred to in the singular herein, this is simply for ease of illustration, and multiple external devices may communicate with the node transceiver 120 via the SPI transceiver 136. As known in the art, the SPI protocol uses sub select (SS), clock (BCLK), main-out-sub-in (MOSI), and main-in-sub-out (MISO) data lines to provide data transfer, and pins corresponding to these four lines are illustrated in FIG. 2. The SPI transceiver 136 may be in communication with the bus protocol circuitry 126 and pins for communication with the external device 138. When the node transceiver 120 is included in the main node 102-1, the external device 138 may include the host 110 or another external device, and the SPI transceiver 136 may provide an SPI sub that can receive and respond to commands from the host 110 or other external device. When the node transceiver 120 is included in a sub node 102-2, the external device 138 may include a peripheral device 108 and the SPI transceiver 136 may provide an SPI host to allow the SPI transceiver 136 to send commands to one or more peripheral devices 108. The SPI transceiver 136 may include a read data first-in-first-out (FIFO) buffer and a write data FIFO buffer. The read data FIFO buffer may be used to collect data read from other nodes 102, and may be read by an external device 138 when the external device 138 transmits an appropriate read command. The write data FIFO buffer may be used to collect write data from the external device 138 before the write data is transmitted to another device.

The node transceiver 120 may include an interrupt request (IRQ) pin in communication with the bus protocol circuitry 126. When the node transceiver 120 is included in the main node 102-1, the bus protocol circuitry 126 may provide event-driven interrupt requests toward the host 110 via the IRQ pin. When the node transceiver 120 is included in a sub node 102-2 (e.g., when the MAIN pin is low), the IRQ pin may serve as a GPIO pin with interrupt request capability. The node transceiver 120 may include other pins in addition to those shown in FIG. 2 (e.g., as discussed below).

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PLLs of each node (e.g., the PLL 128) synchronized. In standby operational mode, reads and writes across the bus 106 are not supported. In a discovery operational mode, the main node 102-1 may send predetermined signals out along the bus 106 and wait for suitable responses to map out the topology of sub nodes 102-2 distributed along the bus 106. In a normal operational mode, full register access may be available to and from the sub nodes 102-2 as well as access to and from peripheral devices 108 over the bus 106. Normal mode may be globally configured by the host 110 with or without synchronous upstream data and with or without synchronous downstream data.

Figure 3:
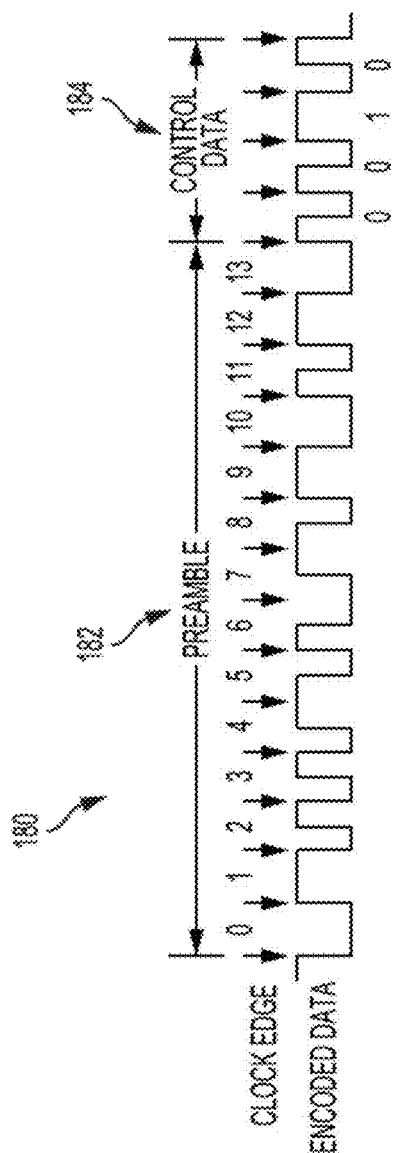
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the main node 102-1, while in an upstream portion, a synchronization response frame, and upstream data may be transmitted to the main node 102-1 from each of the sub nodes 102-2. The synchronization control frame 180 may include a preamble 182 and control data 184. Each sub node 102-2 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
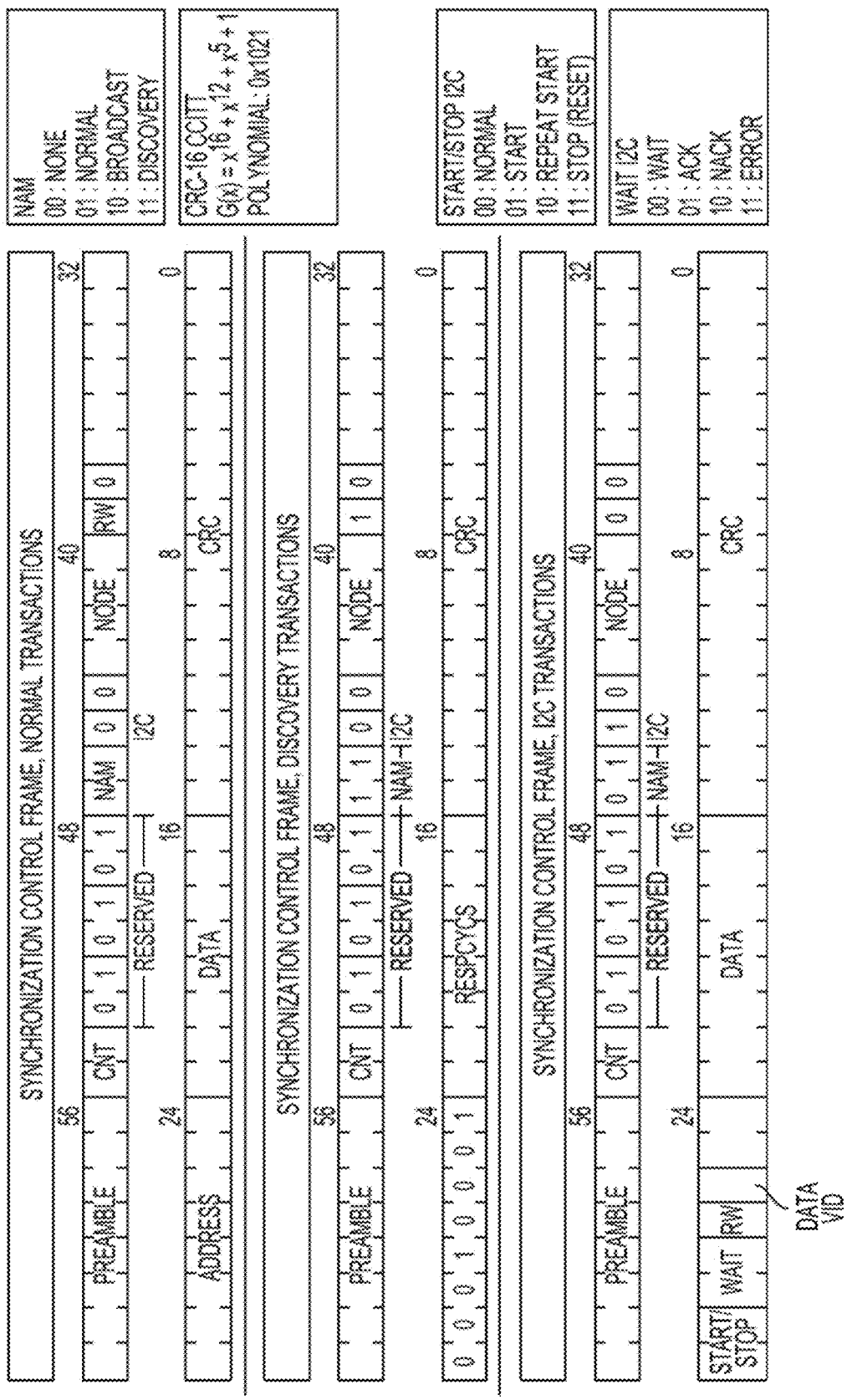
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the sub nodes 102-2 can receive a PLL synchronization signal from the bus 106 without requiring a crystal clock source at the sub nodes 102-2.

Figure 4:
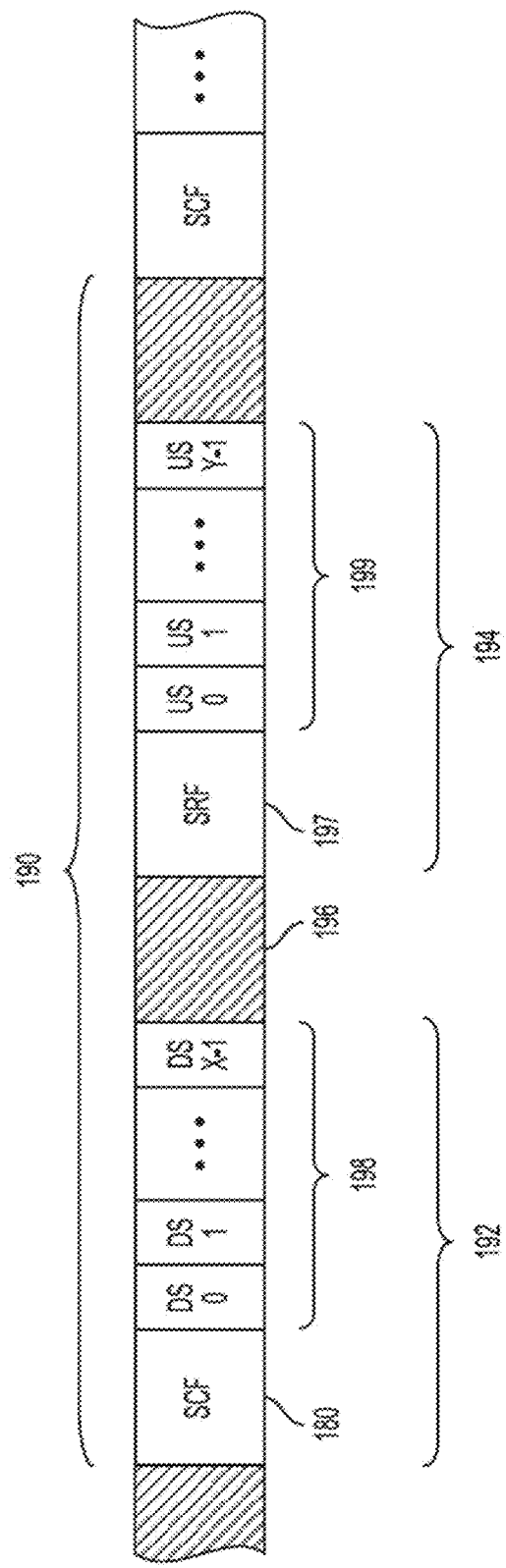
FIG. 4 is a diagram of a superframe used for communication in the system of FIG. 1, in accordance with various embodiments.
Figure 6:
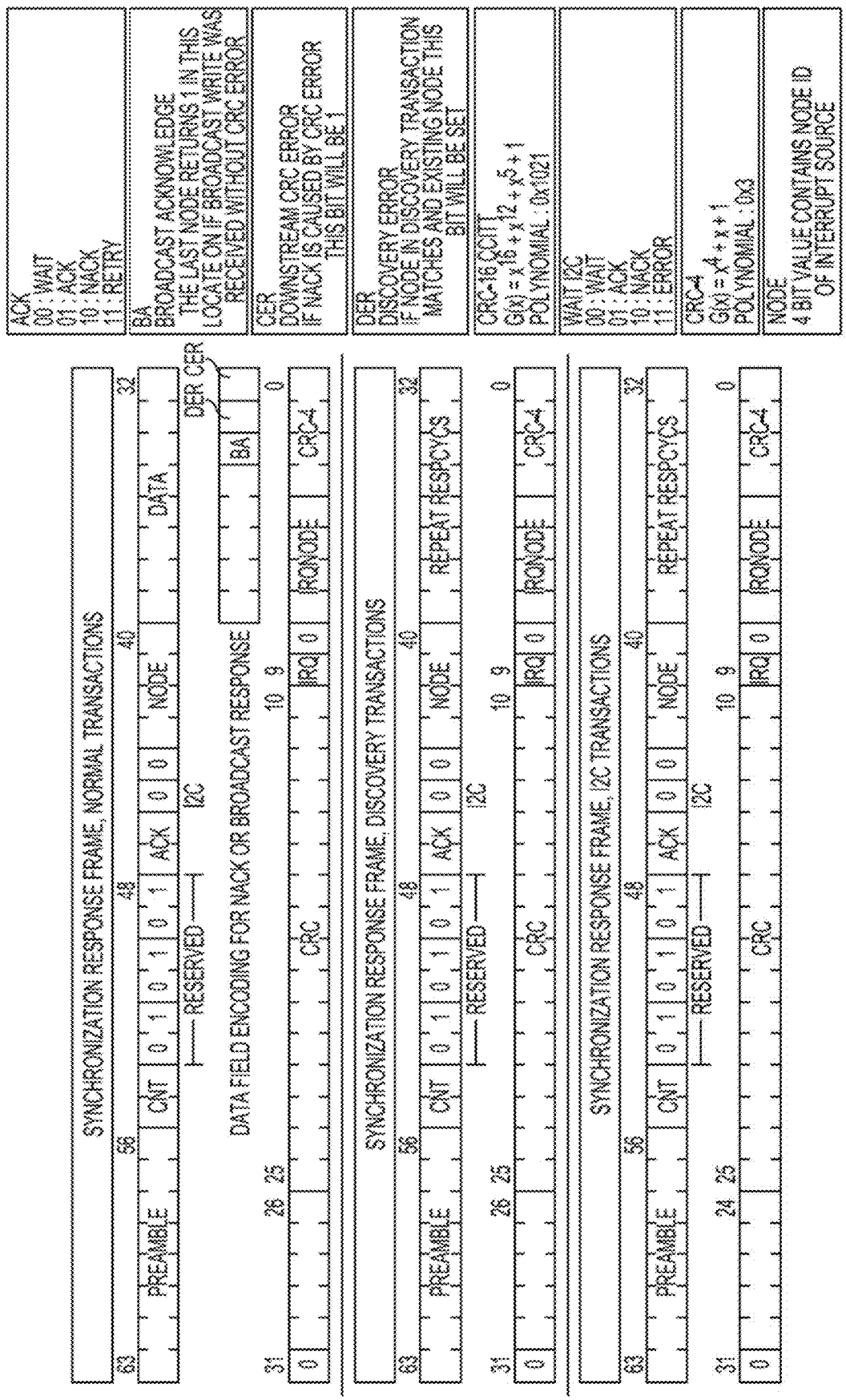
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the main node 102-1 to the last sub node 102-2 (e.g., the sub node 102-2C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each sub node 102-2 may consume a portion of the downstream data slots 198. The last sub node (e.g., sub node 2 in FIG. 1) may respond (after a predetermined response time stored in a register of the last sub node) with a synchronization response frame 197. Upstream, TDM, synchronous data may be added by each sub node 102-2 in the upstream data slots 199 directly after the synchronization response frame 197. The upstream data slots 199 may have equal width. A sub node 102-2 that is not the last sub node (e.g., the sub nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a sub node 102-2 to a downstream sub node 102-2, the preamble 182 may be generated by the transmitting sub node 102-2, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the sub nodes 102-2 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A sub node 102-2 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a sub node 102-2 over the bus 106. In normal mode, registers of a sub node 102-2 may be read from and/or written to based on the ID of the sub node 102-2 and the address of the register. Broadcast transactions are writes which should be taken by every sub node 102-2. In some embodiments, the NAM field may provide for four node addressing modes, including "none" (e.g., data not addressed to any particular sub node 102-2), "normal" (e.g., data unicast to a specific sub node 102-2 specified in the address field discussed below), "broadcast" (e.g., addressed to all sub nodes 102-2), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C sub with respect to an associated sub node 102-2.

In some embodiments, the synchronization control frame 180 may include a node field. The node field may have any suitable length (e.g., 4 bits) and may be used to indicate which sub node is being addressed for normal and I2C accesses. In discovery mode, this field may be used to program an identifier for a newly discovered sub node 102-2 in a node ID register of the sub node 102-2. Each sub node 102-2 in the system 100 may be assigned a unique ID when the sub node 102-2 is discovered by the main node 102-1, as discussed below. In some embodiments, the main node 102-1 does not have a node ID, while in other embodiments, the main node 102-1 may have a node ID. In some embodiments, the sub node 102-2 attached to the main node 102-1 on the bus 106 (e.g., the sub node 0 in FIG. 1) will be sub node 0, and each successive sub node 102-2 will have a number that is 1 higher than the previous sub node. However, this is simply illustrative, and any suitable sub node identification system may be used.

In some embodiments, the synchronization control frame 180 may include a read/write (RW) field. The RW field may have any suitable length (e.g., 1 bit) and may be used to control whether normal accesses are reads (e.g., RW==1) or writes (e.g., RW==0).

In some embodiments, the synchronization control frame 180 may include an address field. The address field may have any suitable length (e.g., 8 bits) and may be used to address specific registers of a sub node 102-2 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered sub node 102-2 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the sub node 102-2 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the sub nodes 102-2 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The main node 102-1 may send read and write requests to the sub nodes 102-2, including both requests specific to communication on the bus 106 and I2C requests. For example, the main node 102-1 may send read and write requests (indicated using the RW field) to one or more designated sub nodes 102-2 (using the NAM and node fields) and can indicate whether the request is a request for the sub node 102-2 specific to the bus 106, an I2C request for the sub node 102-2, or an I2C request to be passed along to an I2C-compatible peripheral device 108 coupled to the sub node 102-2 at one or more I2C ports of the sub node 102-2.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last sub node 102-2 on the bus 106 may wait until the RESPCYCS counter has expired and then begin transmitting a synchronization response frame 197 upstream. If an upstream sub node 102-2 has been targeted by a normal read or write transaction, a sub node 102-2 may generate its own synchronization response frame 197 and replace the one received from downstream. If any sub node 102-2 does not see a synchronization response frame 197 from a downstream sub node 102-2 at the expected time, the sub node 102-2 will generate its own synchronization response frame 197 and begin transmitting it upstream.

The data portion of the synchronization response frame 197 may include fields that contain data used to communicate response information back to the main node 102-1. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a sub node 102-2 to acknowledge a command received in the previous synchronization control frame 180 when that sub node 102-2 generates the synchronization response frame 197. Example indicators that may be communicated in the ACK field include wait, acknowledge, not acknowledge (NACK), and retry. In some embodiments, the ACK field may be sized to transmit an acknowledgment by a sub node 102-2 that it has received and processed a broadcast message (e.g., by transmitting a broadcast acknowledgment to the main node 102-1). In some such embodiments, a sub node 102-2 also may indicate whether the sub node 102-2 has data to transmit (which could be used, for example, for demand-based upstream transmissions, such as non-TDM inputs from a keypad or touchscreen, or for prioritized upstream transmission, such as when the sub node 102-2 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the sub node 102-2 that generates the synchronization response frame 197.

In some embodiments, the synchronization response frame 197 may include a data field. The data field may have any suitable length (e.g., 8 bits), and its value may depend on the type of transaction and the ACK response of the sub node 102-2 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last sub node 102-2 may indicate if the broadcast write was received without error), a discovery error (DER) indicator (indicating whether a newly discovered sub node 102-2 in a discovery transaction matches an existing sub node 102-2), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a sub node 102-2.

In some embodiments, the synchronization response frame 197 may include an IRQ node (IRQNODE) field. The IRQNODE field may have any suitable length (e.g., 4 bits) and may be used to transmit the ID of the sub node 102-2 that has signaled the interrupt presented by the IRQ field. In some embodiments, the sub node 102-2 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any sub node 102-2 that needs to signal an interrupt to the main node 102-1 will insert its interrupt information into these fields. In some embodiments, a sub node 102-2 with an interrupt pending may have higher priority than any sub node 102-2 further downstream that also has an interrupt pending. The last sub node 102-2 along the bus 106 (e.g., the sub node 2 in FIG. 1) may always populate these interrupt fields. If the last sub node 102-2 has no interrupt pending, the last sub node 102-2 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the sub nodes 102-2 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 197 will match it. Additionally or alternatively, the remainder of the synchronization response frame may be structured so that the synchronization sequence cannot occur, such as by placing fixed "0" or "1" values at appropriate bits.

Figure 7:
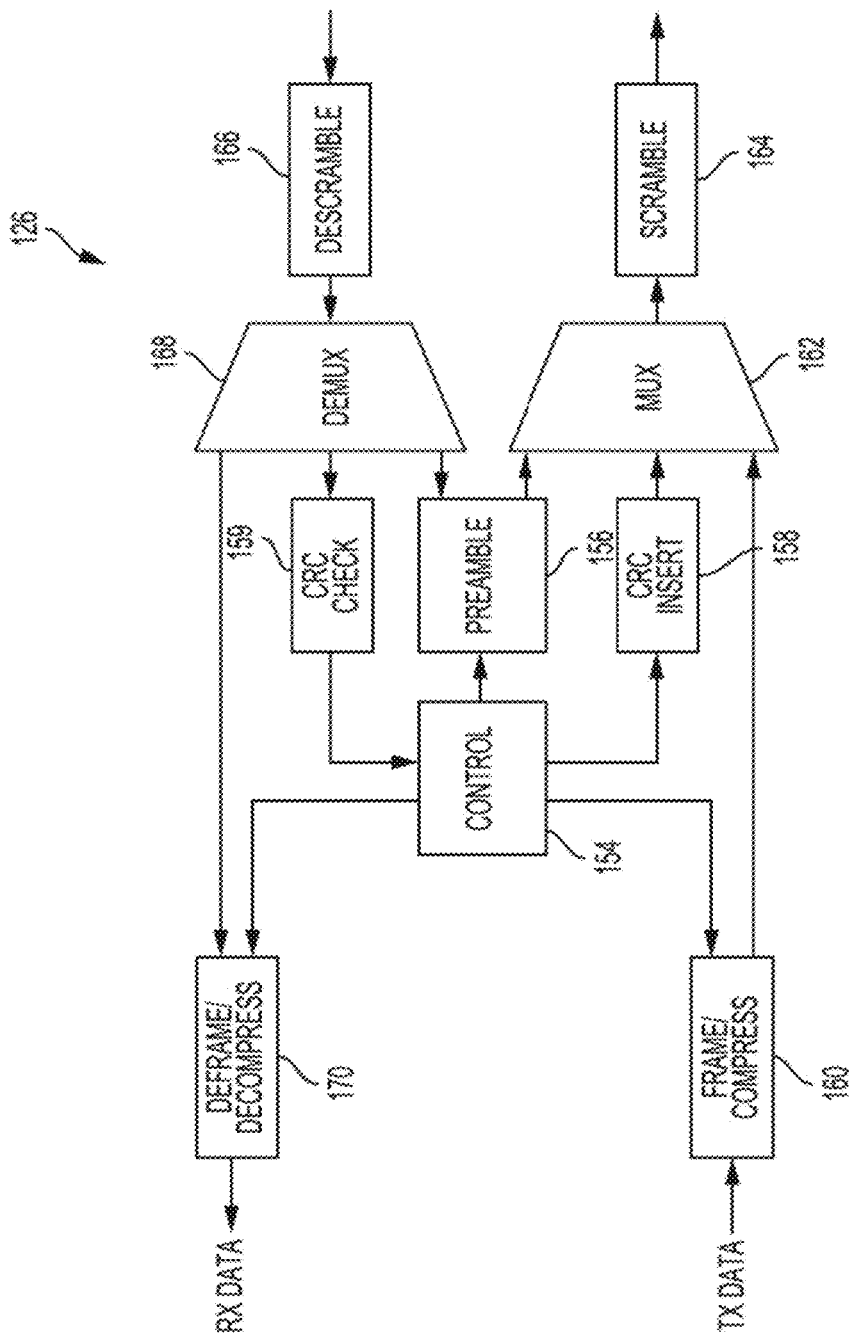
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a sub node 102-2 or from an I2C device when the bus protocol circuitry 126 is included in a main node 102-1), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the main node 102-1 every 1024 bits. As discussed above, one or more sub nodes 102-2 may synchronize to the downstream synchronization control frame preamble and generate local, phase-aligned main clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127), the I2C transceiver 129, and/or the SPI transceiver 136, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N−4 bits of data, where N is the size of the data to be transmitted over the bus 106. The use of data compression may be configured by the main node 102-1 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127), the I2C transceiver 129, and/or the SPI transceiver 136.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a main node 102-1, the values in these registers may be programmed into the control circuitry 154 by the host 110. When the control circuitry 154 is included in a sub node 102-2, the values in these registers may be programmed into the control circuitry 154 by the main node 102-1.

In some embodiments, the control circuitry 154 may include a downstream slots (DNSLOTS) register. When the node transceiver 120 is included in the main node 102-1, this register may hold the value of the total number of downstream data slots. This register may also define the number of data slots that will be used for combined I2S/TDM/PDM receive by the I2S/TDM/PDM transceiver 127 in the main node 102-1. In a sub node 102-2, this register may define the number of data slots that are passed downstream to the next sub node 102-2 before or after the addition of locally generated downstream slots, as discussed in further detail below with reference to LDNSLOTS.

In some embodiments, the control circuitry 154 may include a local downstream slots (LDNSLOTS) register. This register may be unused in the main node 102-1. In a sub node 102-2, this register may define the number of data slots that the sub node 102-2 will use and not retransmit. Alternatively, this register may define the number of slots that the sub node 102-2 may contribute to the downstream bus link 106.

In some embodiments, the control circuitry 154 may include an upstream slots (UPSLOTS) register. In the main node 102-1, this register may hold the value of the total number of upstream data slots. This register may also define the number of slots that will be used for I2S/TDM transmit by the I2S/TDM/PDM transceiver 127 in the main node 102-1. In a sub node 102-2, this register may define the number of data slots that are passed upstream before the sub node 102-2 begins to add its own data.

In some embodiments, the control circuitry 154 may include a local upstream slots (LUPSLOTS) register. This register may be unused in the main node 102-1. In a sub node 102-2, this register may define the number of data slots that the sub node 102-2 will add to the data received from downstream before it is sent upstream. This register may also define the number of data slots that will be used for combined I2S/TDM/PDM receive by the I2S/TDM/PDM transceiver 127 in the sub node 102-2.

In some embodiments, the control circuitry 154 may include a broadcast downstream slots (BCDNSLOTS) register. This register may be unused in the main node 102-1. In a sub node 102-2, this register may define the number of broadcast data slots. In some embodiments, broadcast data slots may always come at the beginning of the data field. The data in the broadcast data slots may be used by multiple sub nodes 102-2 and may be passed downstream by all sub nodes 102-2 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each sub node 102-2 is coupled to one or more speakers and/or one or more microphones as the peripheral device 108. This is simply illustrative, as any desired arrangement of peripheral device 108 may be coupled to any particular sub node 102-2 in accordance with the techniques described herein.

Figure 8:
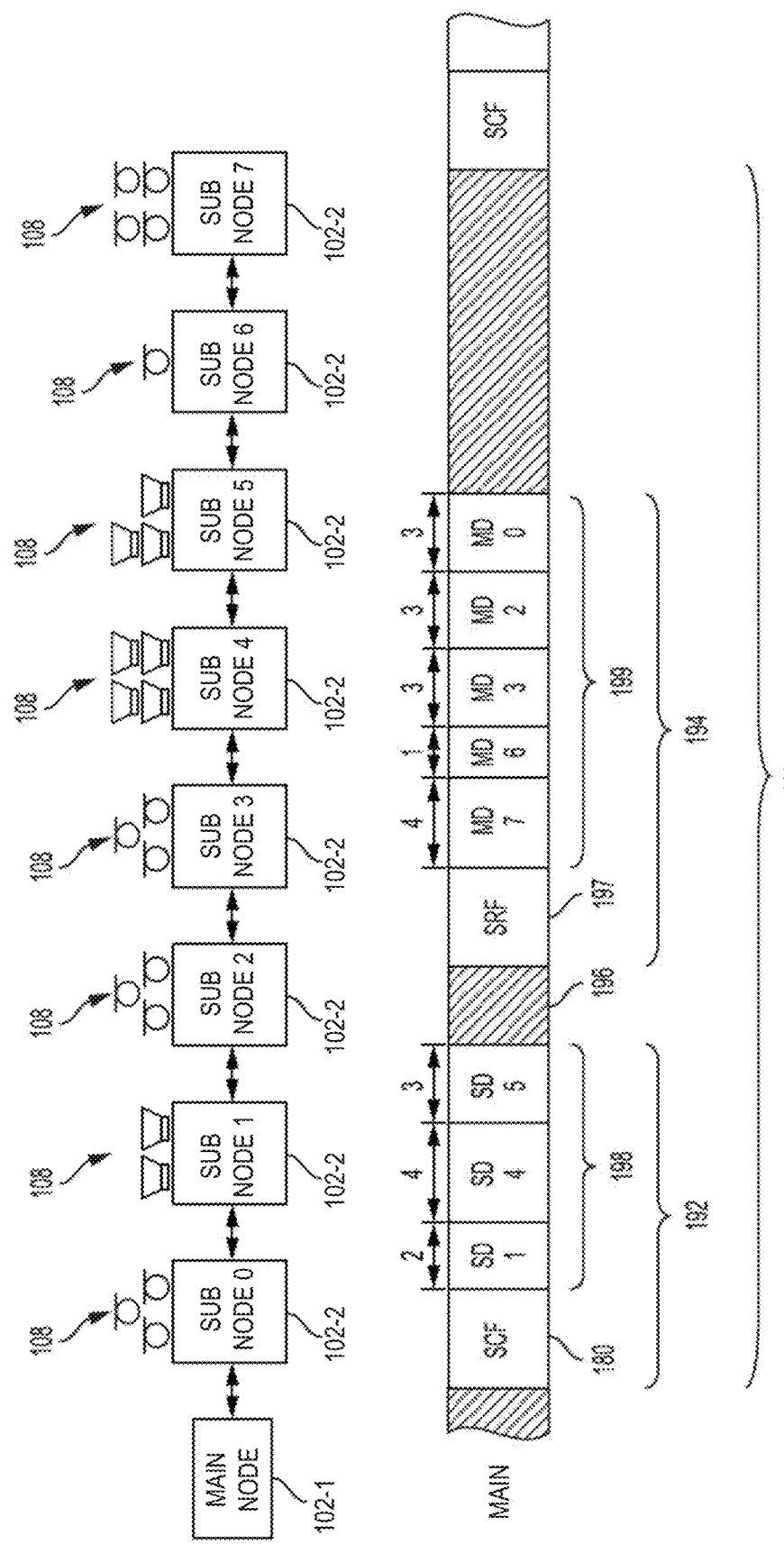
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The sub nodes 102-2 depicted in FIG. 8 have various numbers of sensor/actuator elements, and so different amounts of data may be sent to, or received from, the various sub nodes 102-2. Specifically, sub node 1 has two elements, sub node 4 has four elements, and sub node 5 has three elements, so the data transmitted by the main node 102-1 includes two time slots for sub node 1, four time slots for sub node 4, and three time slots for sub node 5. Similarly, sub node 0 has three elements, sub node 2 has three elements, sub node 3 has three elements, sub node 6 has one element, and sub node 7 has four elements, so the data transmitted upstream by those sub nodes 102-2 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the main node 102-1 or from other sub nodes 102-2) to produce a single data sample, which, depending on the type of processing, could correspond to a single time slot or multiple time slots.

In FIG. 8, the main node 102-1 transmits an SCF followed by data for speakers coupled to specific sub nodes 102-2 (SD). Each successive sub node 102-2 forwards the SCF and also forwards at least any data destined for downstream sub nodes 102-2. A particular sub node 102-2 may forward all data or may remove data destined for that sub node 102-2. When the last sub node 102-2 receives the SCF, that sub node 102-2 transmits the SRF optionally followed by any data that the sub node 102-2 is permitted to transmit. Each successive sub node 102-2 forwards the SRF along with any data from downstream sub nodes 102-2 and optionally inserts data from one or more microphones coupled to the particular sub nodes 102-2 (MD). In the example of FIG. 8, the main node 102-1 sends data to sub nodes 1, 4, and 5 (depicted in FIG. 8 as active speakers) and receives data from sub nodes 7, 6, 3, 2, and 0 (depicted in FIG. 8 as microphone arrays).

Figure 9:
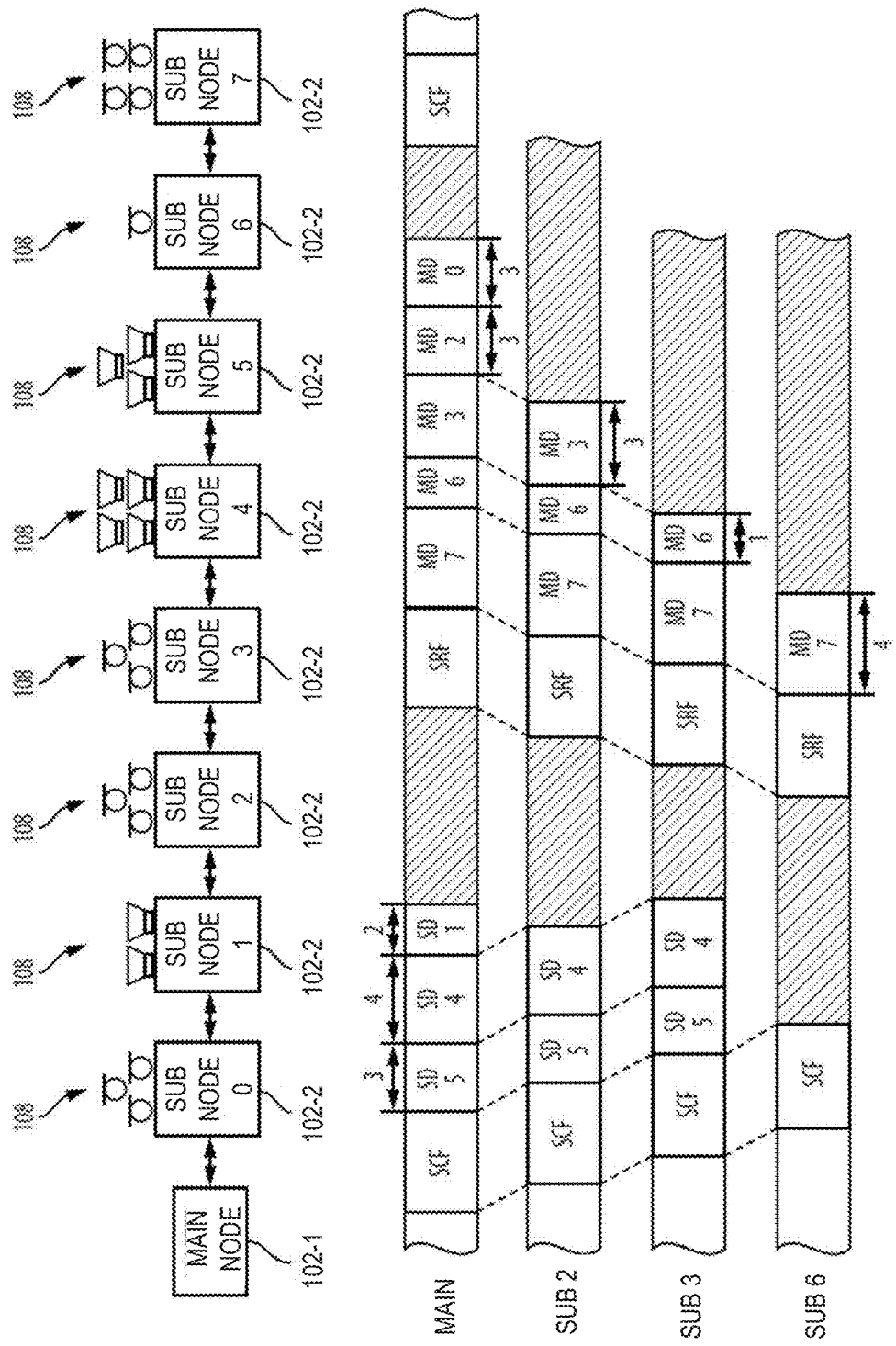

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the main node 102-1 transmits a SCF followed by data for sub nodes 1, 4, and 5 (SD) in reverse order (e.g., data for sub node 5 is followed by data for sub node 4, which is followed by data for sub node 1, etc.) (see the row labeled MAIN). When sub node 1 receives this transmission, sub node 1 removes its own data and forwards to sub node 2 only the SCF followed by the data for sub nodes 5 and 4. Sub nodes 2 and 3 forward the data unchanged (see the row labeled SUB 2), such that the data forwarded by sub node 1 is received by sub node 4 (see the row labeled SUB 3). Sub node 4 removes its own data and forwards to sub node 5 only the SCF followed by the data for sub node 5, and, similarly, sub node 5 removes its own data and forwards to sub node 6 only the SCF. Sub node 6 forwards the SCF to sub node 7 (see the row labeled SUB 6).

At this point, sub node 7 transmits to sub node 6 the SRF followed by its data (see the row labeled SUB 6). Sub node 6 forwards to sub node 5 the SRF along with the data from sub node 7 and its own data, and sub node 5 in turn forwards to sub node 4 the SRF along with the data from sub nodes 7 and 6. Sub node 4 has no data to add, so it simply forwards the data to sub node 3 (see the row labeled SUB 3), which forwards the data along with its own data to sub node 2 (see the row labeled SUB 2), which in turn forwards the data along with its own data to sub node 1. Sub node 1 has no data to add, so it forwards the data to sub node 0, which forwards the data along with its own data. As a result, the main node 102-1 receives the SRF followed by the data from sub nodes 7, 6, 3, 2, and 0 (see the row labeled MAIN).

Figure 10:
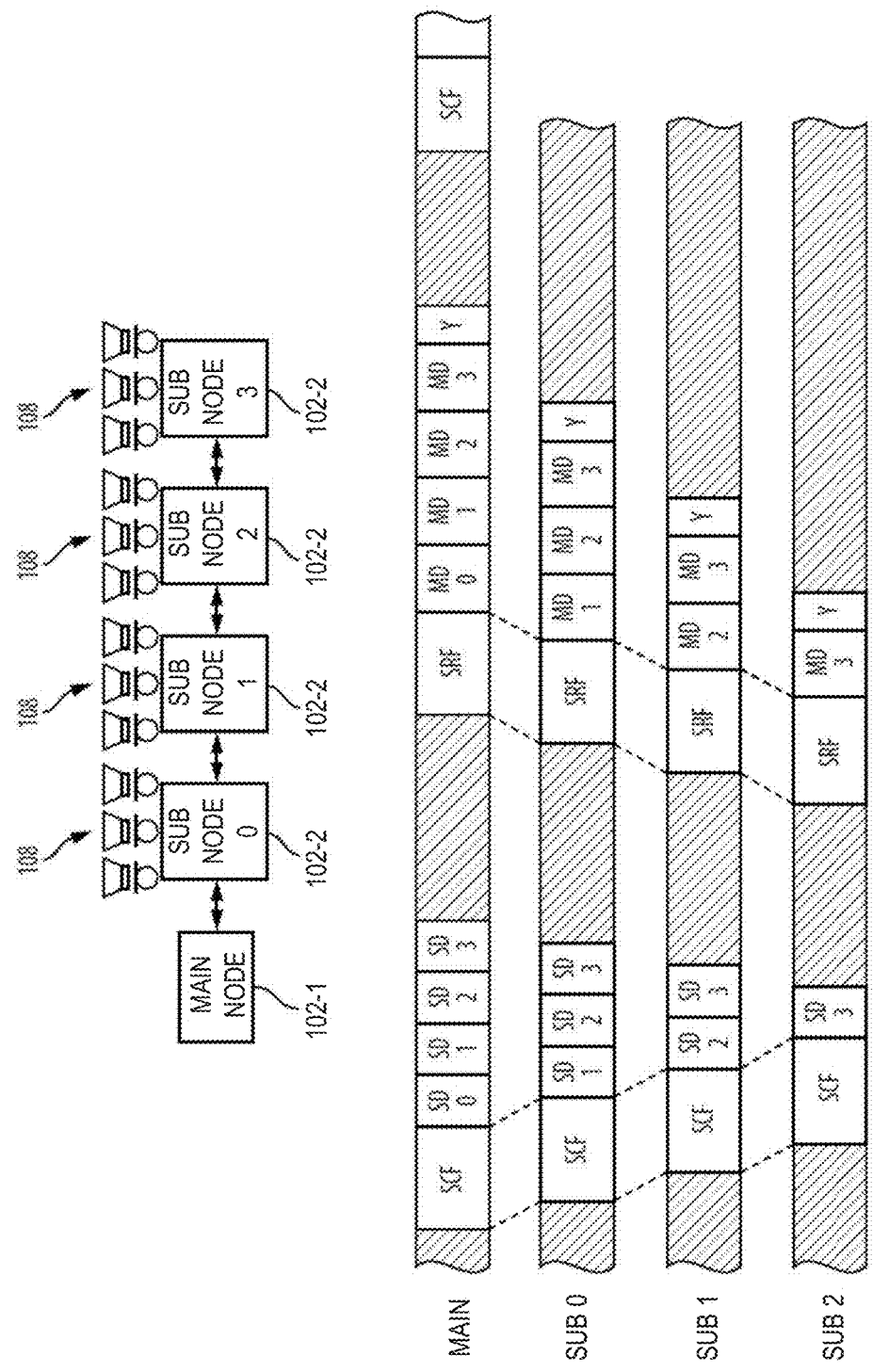

FIG. 10 illustrates another example of the dynamic removal of data from a downstream transmission and insertion of data into an upstream transmission, from the perspective of the downstream DS transceiver 124, as in FIG. 9, although in FIG. 10, the sub nodes 102-2 are coupled with both sensors and actuators as the peripheral device 108 such that the main node 102-1 sends data downstream to all of the sub nodes 102-2 and receives data back from all of the sub nodes 102-2. Also, in FIG. 10, the data is ordered based on the node address to which it is destined or from which it originates. The data slot labeled "Y" may be used for a data integrity check or data correction.

Figure 11:
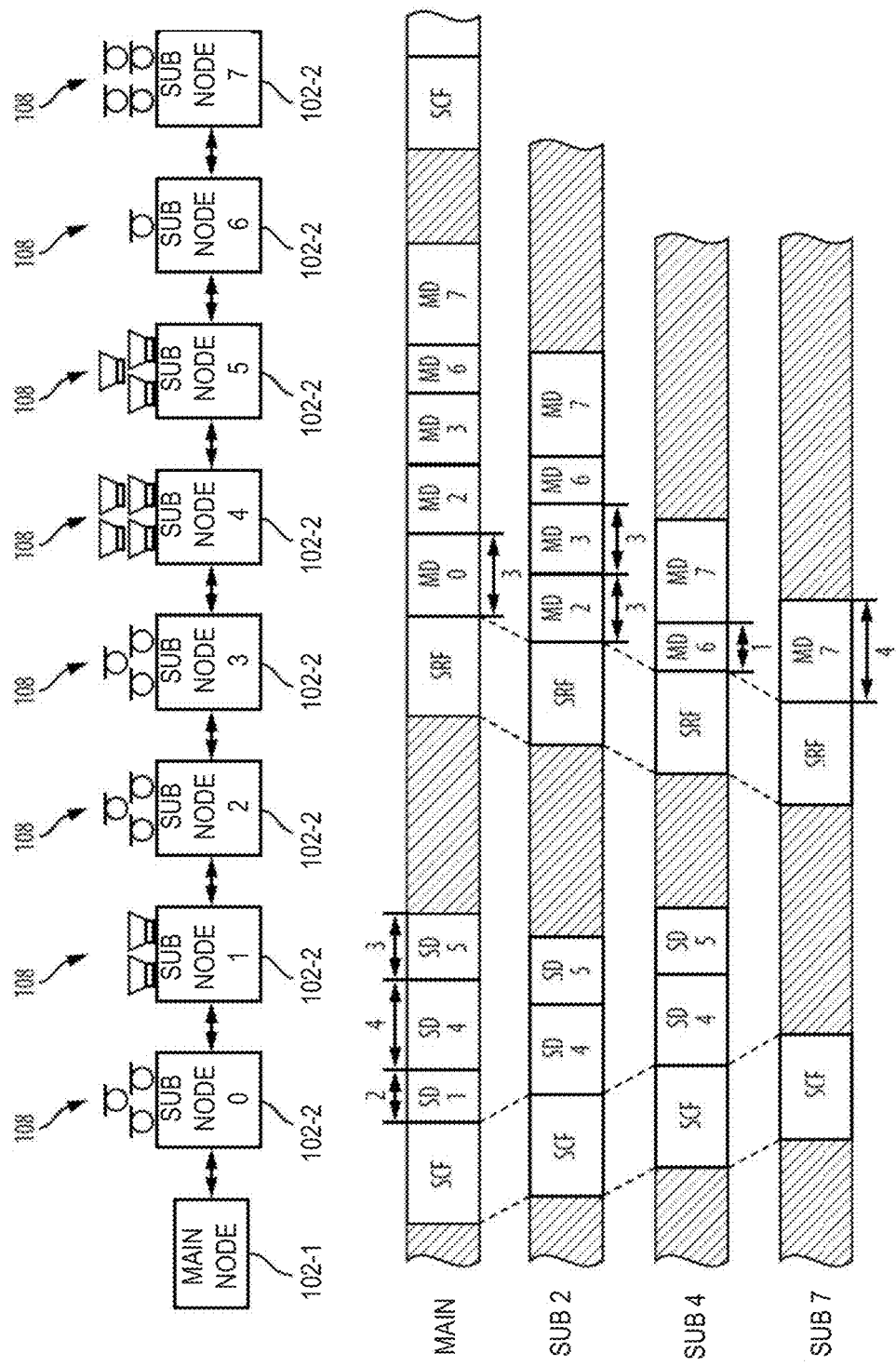

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each sub node 102-2 allows for selectively adding, removing, and/or forwarding data.

As discussed above, each sub node 102-2 may remove data from downstream or upstream transmissions and/or may add data to downstream or upstream transmissions. Thus, for example, the main node 102-1 may transmit a separate sample of data to each of a number of sub nodes 102-2, and each such sub node 102-2 may remove its data sample and forward only data intended for downstream subs. On the other hand, a sub node 102-2 may receive data from a downstream sub node 102-2 and forward the data along with additional data. One advantage of transmitting as little information as needed is to reduce the amount of power consumed collectively by the system 100.

The system 100 may also support broadcast transmissions (and multicast transmissions) from the main node 102-1 to the sub nodes 102-2, specifically through configuration of the downstream slot usage of the sub nodes 102-2. Each sub node 102-2 may process the broadcast transmission and pass it along to the next sub node 102-2, although a particular sub node 102-2 may "consume" the broadcast message, (i.e., not pass the broadcast transmission along to the next sub node 102-2).

The system 100 may also support upstream transmissions (e.g., from a particular sub node 102-2 to one or more other sub nodes 102-2). Such upstream transmissions can include unicast, multicast, and/or broadcast upstream transmissions. With upstream addressing, as discussed above with reference to downstream transmissions, a sub node 102-2 may determine whether or not to remove data from an upstream transmission and/or whether or not to pass an upstream transmission along to the next upstream sub node 102-2 based on configuration of the upstream slot usage of the sub nodes 102-2. Thus, for example, data may be passed by a particular sub node 102-2 to one or more other sub nodes 102-2 in addition to, or in lieu of, passing the data to the main node 102-1. Such sub-sub relationships may be configured, for example, via the main node 102-1.

Thus, in various embodiments, the sub nodes 102-2 may operate as active/intelligent repeater nodes, with the ability to selectively forward, drop, and add information. The sub nodes 102-2 may generally perform such functions without necessarily decoding/examining all of the data, since each sub node 102-2 knows the relevant time slot(s) within which it will receive/transmit data, and hence can remove data from or add data into a time slot. Notwithstanding that the sub nodes 102-2 may not need to decode/examine all data, the sub nodes 102-2 may typically re-clock the data that it transmits/forwards. This may improve the robustness of the system 100.

Figure 12:
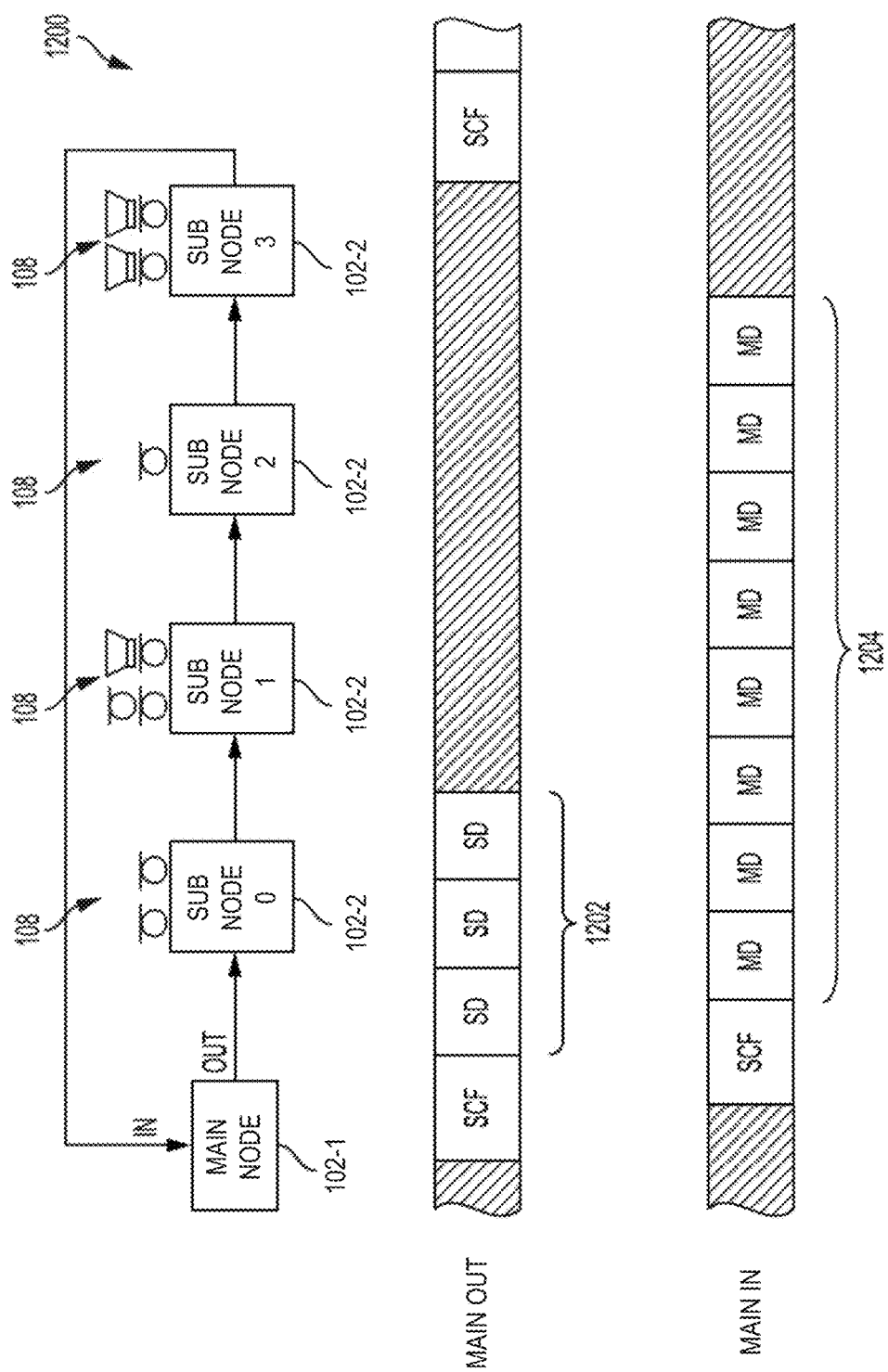
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the main node 102-1 and four sub nodes 102-2 in a ring topology, and illustrates signaling and timing considerations for unidirectional communication in the arrangement 1200, in accordance with various embodiments. In such embodiments, the node transceivers 120 in the nodes may include a receive-only transceiver (MAIN IN) and a transmit-only transceiver (MAIN OUT), rather than two bi-directional transceivers for upstream and downstream communication. In the link-layer synchronization scheme illustrated in FIG. 12, the main node 102-1 transmits a SCF 180, optionally followed by "downstream" data 1202 for the three speakers coupled to various sub nodes 102-2 (the data for the different speakers may be arranged in any suitable order, as discussed above with reference to FIGS. 8-11), and each successive sub node 102-2 forwards the synchronization control frame 180 along with any "upstream" data from prior sub nodes 102-2 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a sub node 102-2 or downstream (e.g., using the data slots 198) by a sub node 102-2 or a main node 102-1. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a sub node 102-2); accesses to registers of the sub nodes 102-2 (e.g., for discovery and configuration of slots and interfaces) that may include write access from the host 110/main node 102-1 to a sub node 102-2 and read access from a sub node 102-2 to the host 110/main node 102-1; and event signaling via interrupts from a peripheral device 108 to the host 110. In some embodiments, GPIO pins may be used to convey information from a sub node 102-2 to the main node 102-1 (e.g., by having the main node 102-1 poll the GPIO pins over I2C, or by having a node transceiver 120 of a sub node 102-2 generate an interrupt at an interrupt request pin). For example, in some such embodiments, a host 110 may send information to the main node 102-1 via I2C, and then the main node 102-1 may send that information to the sub via the GPIO pins. Any of the types of data discussed herein as transmitted over the bus 106 may be transmitted using any one or more of these communication pathways. Other types of data and data communication techniques within the system 100 may be disclosed herein.

Figure 13:
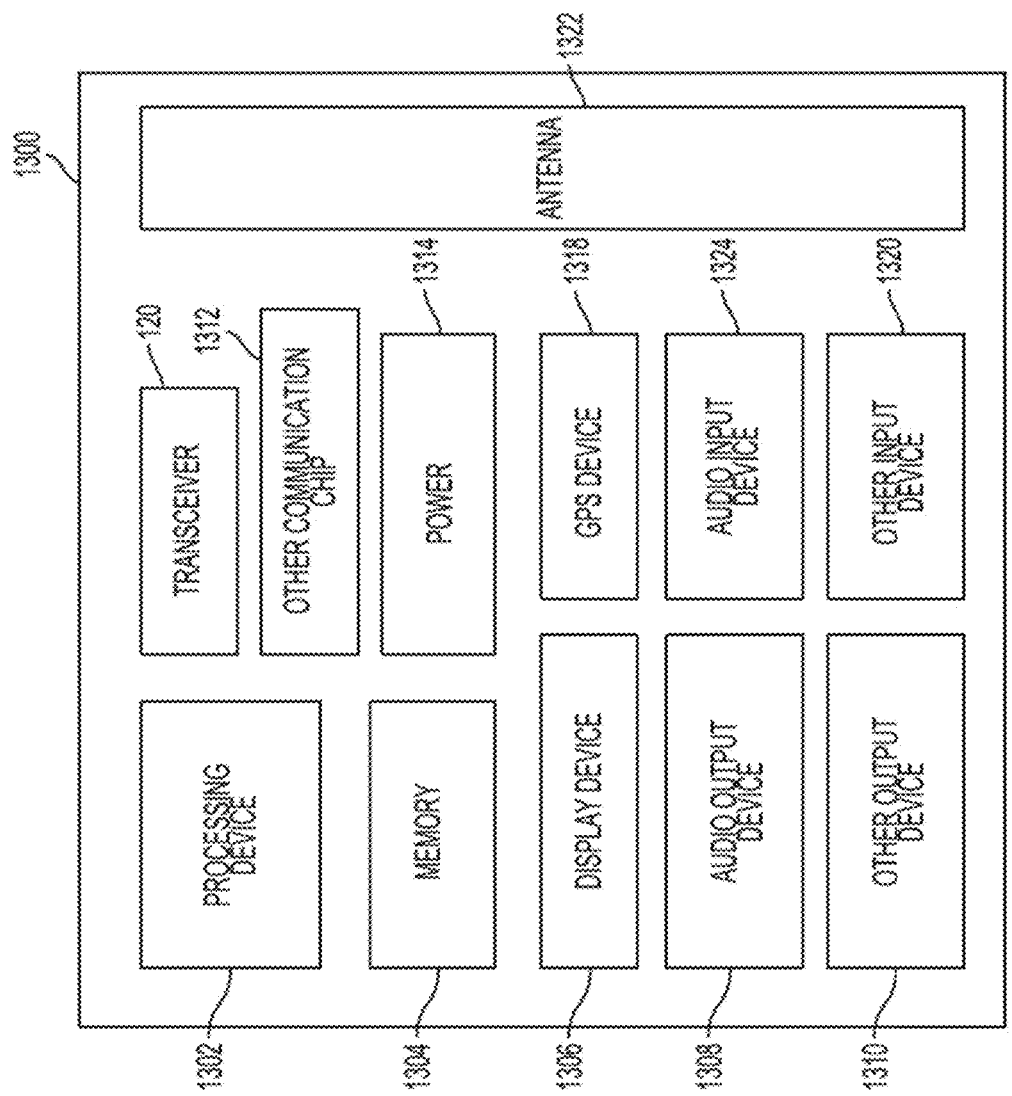
FIG. 13 is a block diagram of a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a main node 102-1, or a sub node 102-2) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more DSPs, ASICs, central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global positioning system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream bus interface circuitry 132 and the downstream bus interface circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a GPS device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a main node 102-1 or a sub node 102-2).

The elements of a system 100 may be chosen and configured to provide audio and/or light control over the bus 106. In some embodiments, the system 100 may be configured to serve as a light control system in a vehicle or other environment, with lighting devices (e.g., strip-line light-emitting diodes (LEDs), LED networks such as Intelligent Smart Embedded LED (ISELED) networks, or other LED arrangements) serving as peripheral devices 108 in communication with nodes 102 along the bus 106; data may be communicated over the bus 106 to control the color, intensity, duty cycle, and/or or other parameters of the lighting devices. In some embodiments, the system 100 may be configured to serve as an audio control system in a vehicle or other environment, with a microphone or other device including an accelerometer that may serve as a peripheral device 108 in communication with a node 102 along the bus 106; data from the accelerometer may be communicated over the bus 106 to control other peripheral devices 108 along the bus 106. For example, large spikes in the acceleration data or other predetermined acceleration data patterns may be used to trigger the generation of a sound effect, such as a cowbell or drum hit, by a processing device coupled to a node 102; that sound effect may be output by a speaker coupled to the processing device and/or by a speaker coupled to another node 102 along the bus 106. Some embodiments of the system 100 may combine any of the lighting control and/or audio control techniques disclosed herein.

Figure 14:
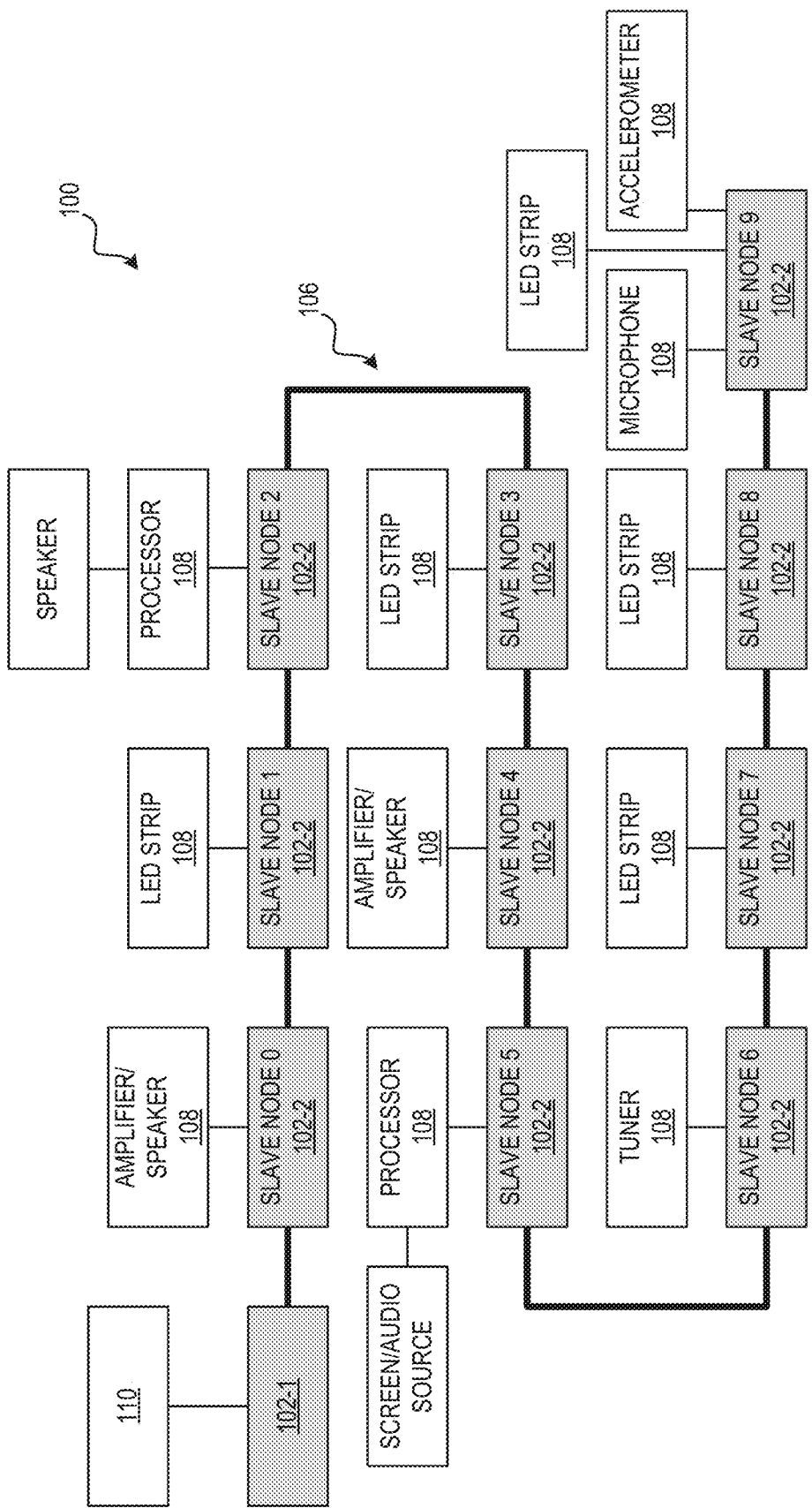
FIG. 14 is a block diagram of a communication system configured for audio and light control, in accordance with various embodiments.

FIG. 14 is a block diagram of a communication system 100 configured for audio and light control, in accordance with various embodiments. The system 100 of FIG. 14 is simply illustrative, and the nodes 102 and associated peripheral devices 108 may be rearranged, omitted, and/or duplicated, as desired. In some embodiments, the bus links 106 between nodes 102 may be two-wire bus links, as disclosed herein, while in other embodiments, the bus links 106 between nodes 102 may be configured in accordance with other communication protocols. In some particular embodiments, the bus links 106 between nodes 102 may be unshielded cables that include a single twisted-wire pair. The system 100 of FIG. 14 may include lighting and audio control functionality, but in other embodiments, the system 100 of FIG. 14 may be used for lighting control without audio control, or vice versa. Further, the system 100 of FIG. 14 may include some but not all of the lighting control functionality (e.g., the light organ functionality and the microphone lighting functionality) discussed herein. Any of the elements of the system 100 of FIG. 14 may include push buttons or other user interface elements whose status may be communicated over the bus 106 (e.g., as GPIO information).

FIG. 14 includes a host 110, a main node 102-1, and ten sub nodes 102-2 (labeled sub nodes 0-9). Any of the nodes 102 may include a node transceiver 120 in accordance with any of the embodiments disclosed herein. The host 110 may include a processing device, such as a DSP. In some embodiments, the host 110 and the main node 102-1 may be part of a head unit in an automobile. In some embodiments, the main node 102-1 may provide a bias voltage over the bus links 106 that may allow sub nodes 102-2 to power their peripheral devices 108; in some embodiments, such "bus power" over the bus links 106 may support up to 50 Watts or more of power delivery and/or up to 24 volts or more of bias voltage.

In the system 100 of FIG. 14, a sub node 0 may be coupled to a peripheral device 108 that includes an amplifier that may drive a speaker. Audio data for the amplifier/speaker may be provided along the bus 106 (e.g., from the screen/audio source communicatively coupled to the sub node 5, or from the tuner communicatively coupled to the sub node 6, as discussed below). In some embodiments, the amplifier/speaker communicatively coupled to the sub node 0 may be located in a door of a vehicle. In some embodiments, the peripheral devices 108 coupled to the sub node 0 may be powered by a bias on the upstream bus link 106, as discussed herein.

In the system 100 of FIG. 14, a sub node 1 may be coupled to a peripheral device 108 that includes an LED strip (which may be used herein to generally refer to any arrangement of one or more LEDs). Data to control the color, intensity, duty cycle, flashing pattern, or other parameters of the LED strip may be communicated to the sub node 1 along the bus 106 (e.g., from the processor coupled to the sub node 5) and then output to the LED strip (e.g., using pulse width modulation (PWM) outputs of the node transceiver 120). In some embodiments, the LED strip communicatively coupled to the sub node 1 may be located proximate to footwells of a vehicle. In some embodiments, the peripheral devices 108 coupled to the sub node 1 may be powered by a bias on the upstream bus link 106, as discussed herein.

In the system 100 of FIG. 14, a sub node 2 may be coupled to a peripheral device 108 that includes a processor. The processor may be communicatively coupled to a speaker. Audio data for the speaker may be provided along the bus 106 (e.g., from the screen/audio source communicatively coupled to the sub node 5, or from the tuner communicatively coupled to the sub node 6, as discussed below), received by the sub node 2, and provided to the processor serving as the peripheral device 108. The processor (e.g., an audio DSP) may perform desired audio signal processing on the audio data, and output the processed data to the speaker. In some embodiments, the speaker communicatively coupled to the sub node 2 may be located near the footwells of a vehicle. In some embodiments, the peripheral device 108 coupled to the sub node 2 may be powered by a power source separate from any bias on the upstream bus link 106.

In some embodiments, the processor communicatively coupled to the sub node 2 may perform echo canceling and/or feedback canceling for karaoke applications (discussed further below). For example, the processor may perform beamforming, feedback cancellation by shifting the microphone frequency, and subtraction of the audio signal. The processor may mix the karaoke sounds and, when the associated speaker is a subwoofer, may directly provide low frequency audio to the subwoofer. In karaoke applications, this processor may also direct audio output over the bus links 106 to the other speakers and to the main node 102-1 (which may utilize the sound input to control the lighting devices in the system 100 in a "light organ" application, as discussed further below).

In the system 100 of FIG. 14, a sub node 3 may be coupled to a peripheral device 108 that includes an LED strip. Data to control the LED strip in any of the ways disclosed herein may be communicated to the sub node 3 along the bus 106 (e.g., from the processor coupled to the sub node 5) and then output to the LED strip (e.g., using PWM outputs of the node transceiver 120). In some embodiments, the LED strip communicatively coupled to the sub node 3 may be located proximate to footwells of a vehicle. In some embodiments, the peripheral devices 108 coupled to the sub node 3 may be powered by a bias on the upstream bus link 106, as discussed herein.

In the system 100 of FIG. 14, a sub node 4 may be coupled to a peripheral device 108 that includes an amplifier that may drive a speaker. Audio data for the amplifier/speaker may be provided along the bus 106 (e.g., from the screen/audio source communicatively coupled to the sub node 5, or from the tuner communicatively coupled to the sub node 6, as discussed below). In some embodiments, the amplifier/speaker communicatively coupled to the sub node 4 may be located in a door of a vehicle. In some embodiments, the peripheral devices 108 coupled to the sub node 4 may be powered by a bias on the upstream bus link 106, as discussed herein.

In the system 100 of FIG. 14, a sub node 5 may be coupled to a peripheral device 108 that includes a processor 108, which may in turn be communicatively coupled to a screen and/or an audio source (e.g., a DVD player). Audio data from the audio source may be selectively provided along the bus 106 by the processor 108 via the sub node 5 (e.g., instead of or in addition to the audio data from the tuner communicatively coupled to the sub node 6, discussed below). In some embodiments, the screen/audio source communicatively coupled to the sub node 5 may be located in a door of a vehicle. In some embodiments, the peripheral devices 108 coupled to the sub node 5 may be powered by a power source separate from any bias on the upstream bus link 106.

In the system 100 of FIG. 14, a sub node 6 may be coupled to a peripheral device 108 that includes a tuner. The tuner may include AM, FM, Digital Audio Broadcasting (DAB), and/or High-Definition (HD) tuning functionality. In some embodiments, the tuner may be controlled via SPI or 120 commands provided over the bus links 106; in particular, the bus links 106 may be used to remotely initialize the tuner, make channel changes, and to receive HD radio metadata like song/composer information or album cover images. Audio data from the tuner may be provided along the bus 106 via the sub node 6 to the sub node 2, received by the sub node 2, and selectively provided to other nodes 102 along the bus by the processor serving as the peripheral device 108 of the sub node 5 (e.g., instead of or in addition to the audio data from the audio source communicatively coupled to the sub node 5, as discussed above). In some embodiments, the tuner communicatively coupled to the sub node 2 may be located near the footwells of a vehicle. In some embodiments, the peripheral device 108 coupled to the sub node 6 may be powered by a bias on the upstream bus link 106, as discussed herein.

In vehicle settings, the tuner may not be located in the head unit of the vehicle, and may instead be located closer to an antenna (which may be located, for example, proximate to the roof of the vehicle). Such an implementation may reduce or eliminate the use of coaxial cables inside the vehicle cabin and/or may reduce or eliminate the use of antenna pre-amplifiers (which may be needed when the antenna is not directly connected to the tuner).

In the system 100 of FIG. 14, a sub node 7 may be coupled to a peripheral device 108 that includes an LED strip. Data to control the LED strip in any of the ways disclosed herein may be communicated to the sub node 7 along the bus 106 (e.g., from the processor coupled to the sub node 5) and then output to the LED strip (e.g., using PWM outputs of the node transceiver 120). In some embodiments, the LED strip communicatively coupled to the sub node 7 may be located proximate to a roof of a vehicle. In some embodiments, the peripheral devices 108 coupled to the sub node 7 may be powered by a bias on the upstream bus link 106, as discussed herein.

In the system 100 of FIG. 14, a sub node 8 may be coupled to a peripheral device 108 that includes an LED strip. Data to control the LED strip in any of the ways disclosed herein may be communicated to the sub node 8 along the bus 106 (e.g., from the processor coupled to the sub node 5) and then output to the LED strip (e.g., using PWM outputs of the node transceiver 120). In some embodiments, the LED strip communicatively coupled to the sub node 8 may be located proximate to a roof of a vehicle. In some embodiments, the peripheral devices 108 coupled to the sub node 8 may be powered by a bias on the upstream bus link 106, as discussed herein.

In the system 100 of FIG. 14, a sub node 9 may be coupled to multiple peripheral devices 108 that may provide or consume data transmitted along the bus 106. The peripheral devices 108 may include a microphone (which may generate microphone data that may be transmitted along the bus 106 via the sub node 9), an LED strip (which may be controlled using data provided to the sub node 9 via the bus 106, in accordance with any of the embodiments discussed herein), and/or an accelerometer (which may generate accelerometer data that may be transmitted along the bus 106 via the sub node 9).

In some embodiments of the system 100 of FIG. 14, the microphone, the LED strip, and the accelerometer may all be part of a single integral handheld device (e.g., a handheld microphone with integral LEDs and an accelerometer). As noted above, in some embodiments, the system 100 may be configured to serve as an audio control system in a vehicle or other environment, with data from the accelerometer communicated over the bus 106 via the sub node 9 to control other peripheral devices 108 along the bus 106. For example, the acceleration data generated by the accelerometer may be communicated to the main node 102-1 over the bus 106 via the sub node 9. The main node 102-1 (e.g., a processing device communicatively coupled to the main node 102-1) may analyze the data to detect large spikes or other predetermined acceleration data patterns. Upon detection of such patterns, the main node 102-1 may cause audio data corresponding to a sound effect to be transmitted over the bus 106 to the sub node 2, where the processor communicatively coupled to the sub node 2 may mix this sound effect and other audio data, and may provide the mixed data to the bus 106 to be output by any desired one or more of the speakers of the system 100. The main node 102-1 may be configured to detect different acceleration data patterns (e.g., corresponding to different movements of a user holding the microphone), and cause correspondingly different sound effects to be generated. In some embodiments, such a system 100 may be configured to act as a karaoke system, with song-related audio and video information (e.g., including the lyrics of the song) provided by the screen/audio source communicatively coupled to the sub node 5, a user's voice provided by the microphone communicatively coupled to the sub node 9, and sound effects triggered by data from the accelerometer communicatively coupled to the sub node 9 (e.g., sharing a housing with the microphone).

In some embodiments, the system 100 of FIG. 14 may be configured to act as a light organ. As used herein, a "light organ" may refer to a system in which lighting devices (e.g., LEDs) are operated in a manner that is synchronized with accompanying music. For example, the main node 102-1 (e.g., a processing device, such as a DSP, communicatively coupled to the main node 102-1) may receive audio data from the screen/audio source or from the tuner, may perform beat detection and/or frequency analysis operations on the received audio data, and may output control signals for the LED strips in the system 100 to cause the LED strips to output light in a pattern that "matches" the audio data. In this manner, the lighting emitted by the system 100 may vary and may be synchronized with music played by the system 100. In some embodiments, one or more of the LED strips included in the system 100 may "flash" in accordance with the detected beat of the music and/or may change color depending upon the dominant instantaneous frequencies of the music. In some embodiments, the LED strip integral with a microphone (as discussed above) may be controlled in this light organ fashion (e.g., during karaoke). In other embodiments, the microphone may be wireless. In some embodiments, the system 100 may act as a light organ integrated with a musical instrument (e.g., a guitar).

In some embodiments, the system 100 of FIG. 14 may control lighting in a vehicle. For example, one or more of the sub nodes 102-2 may be coupled to one or more LEDs in a vehicle. Such LEDs may provide static indicators (e.g., backlighting one or more push buttons, such as an emergency call button, a concierge call button, and/or a hazard light button), dynamic indicators (e.g., an LED in a call button that lights to indicate that a call is in progress, and/or dynamically illuminating one or more LEDs during in-car communication in response to sound, such as the light organ discussed above), general cabin lighting (e.g., legroom lighting, accent lighting, light strips, lighting of an instrument panel, any of which may be status or may change upon changes in operational status of the vehicle, such as the opening and closing of doors), or reading lights (e.g., providing white light or colored light directed to a particular seat in a vehicle). In some embodiments, a node transceiver 120 may control LEDs used to backlight one or more speakers in a system 100 (e.g., when the speakers have translucent cones).

As noted above, in some embodiments, one or more LEDs (e.g., included in any of the LED strips 108 or other lighting devices discussed above) or other devices may be controlled by PWM outputs of a node transceiver 120. A node transceiver 120 may include one or more PWM outputs; for example, FIG. 2 illustrates a node transceiver 120 with four PWM outputs (labeled PWM0, PWM1, PWM2, and PWM3) that are coupled to one or more external devices 139. The external devices 139 may include one or more LEDs (e.g., any of the LED strips 108 discussed above with reference to FIG. 14), or any other device that may be driven or controlled by a PWM signal. In some embodiments, the PWM outputs may be a dedicated set of pins of the node transceiver 120, while in other embodiments, the PWM outputs may "share" a set of pins of the node transceiver 120 with another input/output functionality. For example, in some embodiments, four PWM outputs of a node transceiver 120 may share the four pins associated with the SPI transceiver 136 (i.e., SS, BCLK, MOSI, MISO); a memory in the node transceiver 120 (e.g., a programmable register) may be programmed (e.g., by the host 110, the main node 102-1, or another sub node 102-2 via the bus 106) with one or more indicators to determine whether some or all of the four pins are to be used as PWM outputs or as SPI inputs/outputs.

In some embodiments, the node transceiver 120 may be programmable (e.g., by the host 110 and/or the main node 102-1 via the bus 106) to control the PWM outputs. For example, a memory of the node transceiver 120 (e.g., a programmable register) may be programmed (e.g., by the host 110, the main node 102-1, or another sub node 102-2 via the bus 106) to control the duty cycle of individual ones of the PWM outputs. In some embodiments, one or more data slots (e.g., the data slots 198 and 199 discussed above with reference to FIG. 4) may be used to set the duty cycle of a PWM output; a node transceiver 120 may be programmed to use particular data slots for PWM control. In some embodiments, the node transceiver 120 may include programmable logic to control a blink pattern of one or more of the PWM outputs (e.g., to control a corresponding blink rate of LEDs coupled to the PWM outputs, which may be a dynamic blink rate). Such programmable logic may gate the PWM outputs to set a blink pattern of LEDs coupled to the PWM outputs. In some embodiments, processing circuitry (e.g., a DSP) coupled to a node transceiver 120 (e.g., using the I2S/TDM/PDM transceiver 127) may control LEDs coupled to a PWM output of another node transceiver 120 by sending appropriate signals over the bus 106 between the node transceivers 120; in some such embodiments, the processing circuitry may implement audio algorithms, and the control signals for the LEDs may be related to audio data processed by the processing circuitry (e.g., the processing circuitry may perform audio beat detection on an audio signal (e.g., audio output by a speaker coupled to a node transceiver 120), and may send control signals to the LEDs to cause the LEDs to flash with the audio beat).

In some embodiments, a memory of the node transceiver 120 (e.g., a programmable register) may be programmed (e.g., by the host 110, the main node 102-1, or another sub node 102-2 via the bus 106) to cause the signals output by the PWM outputs to perform random frequency hopping (e.g., between 187.5 hertz and 4 kilohertz, or in any other desired frequency range) to reduce undesirable electromagnetic emissions from the node transceiver 120. In some such embodiments, the random frequency hopping may include a 90-degree phase shift between different ones of the PWM outputs to further reduce undesirable electromagnetic emissions. In some embodiments, the PWM outputs of a node transceiver 120 may have sufficient drive power so as to drive PWM devices (e.g., LEDs) directly, while in other embodiments, the external devices 139 may include driver circuitry (e.g., LED driver circuitry). Driver circuitry included in the external devices 139 may include linear driver circuitry or DC-DC switching driver circuitry. In some embodiments, the PWM outputs of a node transceiver 120 may be used to control the power supply level of an audio amplifier included in the external devices 139 (e.g., in a frequency range that spans from just below AM frequencies to just above AM frequencies). For example, the level of an audio amplifier power supply may be set higher when high sound volume is specified (e.g., via a knob control) and/or if a temporary load sound is expected from a speaker (e.g., associated with a look-ahead function in an audio DSP), and the level of the audio amplifier power supply may be set lower when less power is needed. Such an arrangement may help optimize power consumption of the audio amplifier.

Although various ones of the embodiments discussed above describe the system 100 in a vehicle setting, this is simply illustrative, and the system 100 may be implemented in any desired setting. For example, in some embodiments, a "suitcase" implementation of the system 100 may include a portable housing that includes the desired components of the system 100; such an implementation may be particularly suitable for portable applications, such as portable karaoke or entertainment systems.

The following paragraphs provide examples of the embodiments disclosed herein.

Example A1 is a node transceiver, including: a node transceiver, wherein the node transceiver includes transceiver circuitry to couple to a link of a two-wire bus; and pulse width modulation (PWM) circuitry to provide a PWM output to a peripheral device, and operational characteristics of the PWM circuitry are programmable by signals received via the transceiver circuitry.

Example A2 includes the subject matter of Example A1, and further specifies that the operational characteristics include a duty cycle of the PWM output.

Example A3 includes the subject matter of any of Examples A1-2, and further specifies that the operational characteristics include a blink pattern of the PWM output.

Example A4 includes the subject matter of any of Examples A1-3, and further specifies that the operational characteristics include a random frequency hopping of the PWM output.

Example A5 includes the subject matter of any of Examples A1-4, and further specifies that the PWM output includes a plurality of PWM outputs.

Example A6 includes the subject matter of Example A5, and further specifies that the operational characteristics include a phase shift between individual ones of the plurality of PWM outputs.

Example A7 includes the subject matter of any of Examples A1-6, and further specifies that the node transceiver is included in a vehicle.

Example A8 includes the subject matter of Example A7, and further specifies that the node transceiver is to control a light-emitting diode in the vehicle.

Example A9 includes the subject matter of any of Examples A1-6, and further specifies that the node transceiver is included in a microphone.

Example A10 includes the subject matter of any of Examples A1-6, and further specifies that the node transceiver is included in a musical instrument.

Example A11 includes the subject matter of any of Examples A1-10, and further specifies that the node transceiver is to control a light organ.

Example A12 includes the subject matter of any of Examples A1-11, and further specifies that the PWM output of the PWM circuitry is to change in response to audio data received at the node transceiver via the link of the two-wire bus.

Example A13 includes the subject matter of Example A12, and further includes: audio output circuitry to provide the audio data to a speaker.

Example A14 includes the subject matter of Example A13, and further specifies that the audio output circuitry is further to output a sound effect to the speaker based on an accelerometer signal.

Example A15 includes the subject matter of Example A14, and further specifies that the accelerometer signal is provided to the node transceiver via the link of the two-wire bus.

Example A16 includes the subject matter of any of Examples A1-15, and further specifies that the node transceiver is to transmit link synchronization information over the two-wire bus in a frame of data.

Example A17 includes the subject matter of any of Examples A1-16, and further specifies that the transceiver circuitry is upstream transceiver circuitry, and the link of the two-wire bus is an upstream link of a two-wire bus.

Example A18 includes the subject matter of Example A17, and further specifies that the node transceiver further includes: downstream transceiver circuitry to couple to a downstream link of a two-wire bus.

Example A19 includes the subject matter of any of Examples A1-16, and further specifies that the transceiver circuitry is downstream transceiver circuitry, and the link of the two-wire bus is a downstream link of a two-wire bus.

Example A20 includes the subject matter of Example A19, and further specifies that the node transceiver further includes: upstream transceiver circuitry to couple to an upstream link of a two-wire bus.

Example A21 is a lighted apparatus, including: a node transceiver, wherein the node transceiver includes transceiver circuitry to couple to a link of a two-wire bus, and the node transceiver further includes pulse width modulation (PWM) circuitry; and a lighting device coupled to the node transceiver, wherein the PWM circuitry is to provide a PWM output to the lighting device.

Example A22 includes the subject matter of Example A21, and further specifies that the lighting device includes a light-emitting diode.

Example A23 includes the subject matter of any of Examples A21-22, and further specifies that the lighting device includes a plurality of light-emitting diodes.

Example A24 includes the subject matter of any of Examples A21-23, and further specifies that the lighting device includes a strip of light-emitting diodes.

Example A25 includes the subject matter of any of Examples A21-24, and further specifies that operational characteristics of the PWM circuitry are programmable by signals received via the transceiver circuitry.

Example A26 includes the subject matter of Example A25, and further specifies that the operational characteristics include a duty cycle of the PWM output.

Example A27 includes the subject matter of any of Examples A25-26, and further specifies that the operational characteristics include a blink pattern of the PWM output.

Example A28 includes the subject matter of any of Examples A25-27, and further specifies that the operational characteristics include a random frequency hopping of the PWM output.

Example A29 includes the subject matter of any of Examples A25-28, and further specifies that the PWM output includes a plurality of PWM outputs.

Example A30 includes the subject matter of Example A29, and further specifies that the operational characteristics include a phase shift between individual ones of the plurality of PWM outputs.

Example A31 includes the subject matter of any of Examples A21-30, and further specifies that the lighted apparatus is a vehicle.

Example A32 includes the subject matter of Example A31, and further specifies that the lighting device is in an instrument panel of the vehicle.

Example A33 includes the subject matter of Example A31, and further specifies that the lighting device is near a footwell of the vehicle.

Example A34 includes the subject matter of Example A31, and further specifies that the lighting device is a reading light in the vehicle.

Example A35 includes the subject matter of Example A31, and further specifies that the lighting device is in a cabin of the vehicle.

Example A36 includes the subject matter of any of Examples A21-30, and further specifies that the lighted apparatus includes a microphone, and the lighting device is included in the microphone.

Example A37 includes the subject matter of Example A36, and further specifies that the lighting device includes a strip of light-emitting diodes.

Example A38 includes the subject matter of any of Examples A36-37, and further specifies that the PWM circuitry is to change the PWM output with changes in sound detected by the microphone.

Example A39 includes the subject matter of any of Examples A36-38, and further specifies that the lighted apparatus is a karaoke unit.

Example A40 includes the subject matter of any of Examples A21-30, and further specifies that the lighted apparatus includes a musical instrument, and the lighting device is included in the musical instrument.

Example A41 includes the subject matter of Example A40, and further specifies that the lighting device includes a strip of light-emitting diodes.

Example A42 includes the subject matter of any of Examples A40-41, and further specifies that the PWM circuitry is to change the PWM output with changes in signals output by the musical instrument.

Example A43 includes the subject matter of any of Examples A21-42, and further specifies that the lighting device is part of a light organ.

Example A44 includes the subject matter of Example A43, and further specifies that the PWM output of the PWM circuitry is to change in response to audio data received at the node transceiver via the link of the two-wire bus.

Example A45 includes the subject matter of any of Examples A21-44, and further specifies that the PWM output of the PWM circuitry is to change in response to audio data received at the node transceiver via the link of the two-wire bus.

Example A46 includes the subject matter of Example A45, and further includes: audio output circuitry to provide the audio data to a speaker.

Example A47 includes the subject matter of Example A46, and further specifies that the audio output circuitry is further to output a sound effect to the speaker based on an accelerometer signal.

Example A48 includes the subject matter of Example A47, and further specifies that the accelerometer signal is provided to the node transceiver via the link of the two-wire bus.

Example A49 includes the subject matter of any of Examples A21-48, and further specifies that the node transceiver is to transmit link synchronization information over the two-wire bus in a frame of data.

Example A50 includes the subject matter of any of Examples A21-49, and further specifies that the transceiver circuitry is upstream transceiver circuitry, and the link of the two-wire bus is an upstream link of a two-wire bus.

Example A51 includes the subject matter of Example A50, and further specifies that the node transceiver further includes: downstream transceiver circuitry to couple to a downstream link of a two-wire bus.

Example A52 includes the subject matter of any of Examples A21-49, and further specifies that the transceiver circuitry is downstream transceiver circuitry, and the link of the two-wire bus is a downstream link of a two-wire bus.

Example A53 includes the subject matter of Example A52, and further specifies that the node transceiver further includes: upstream transceiver circuitry to couple to an upstream link of a two-wire bus.

Example A54 is an audiovisual apparatus, including: a node transceiver, wherein the node transceiver includes transceiver circuitry to couple to a link of a two-wire bus, and the node transceiver further includes pulse width modulation (PWM) circuitry; a lighting device coupled to the node transceiver, wherein the PWM circuitry is to provide a PWM output to the lighting device; and a speaker coupled to the node transceiver, wherein the speaker is to output audio data received by the transceiver circuitry via the link of the two-wire bus.

Example A55 includes the subject matter of Example A54, and further specifies that the lighting device includes a light-emitting diode.

Example A56 includes the subject matter of any of Examples A54-55, and further specifies that the lighting device includes a plurality of light-emitting diodes.

Example A57 includes the subject matter of any of Examples A54-56, and further specifies that the lighting device includes a strip of light-emitting diodes.

Example A58 includes the subject matter of any of Examples A54-57, and further specifies that operational characteristics of the PWM circuitry are programmable by signals received via the transceiver circuitry.

Example A59 includes the subject matter of Example A58, and further specifies that the operational characteristics include a duty cycle of the PWM output.

Example A60 includes the subject matter of any of Examples A58-59, and further specifies that the operational characteristics include a blink pattern of the PWM output.

Example A61 includes the subject matter of any of Examples A58-60, and further specifies that the operational characteristics include a random frequency hopping of the PWM output.

Example A62 includes the subject matter of any of Examples A58-61, and further specifies that the PWM output includes a plurality of PWM outputs.

Example A63 includes the subject matter of Example A62, and further specifies that the operational characteristics include a phase shift between individual ones of the plurality of PWM outputs.

Example A64 includes the subject matter of any of Examples A54-63, and further specifies that the audiovisual apparatus is a vehicle.

Example A65 includes the subject matter of Example A64, and further specifies that the lighting device is in an instrument panel of the vehicle.

Example A66 includes the subject matter of Example A64, and further specifies that the lighting device is near a footwell of the vehicle.

Example A67 includes the subject matter of Example A64, and further specifies that the lighting device is a reading light in the vehicle.

Example A68 includes the subject matter of Example A64, and further specifies that the lighting device is in a cabin of the vehicle.

Example A69 includes the subject matter of any of Examples A54-68, and further specifies that the audio data originates from a microphone coupled to another node transceiver on the two-wire bus.

Example A70 includes the subject matter of Example A69, and further specifies that the microphone includes a plurality of microphones.

Example A71 includes the subject matter of any of Examples A69-70, and further specifies that the PWM circuitry is to change the PWM output with changes in sound detected by the microphone.

Example A72 includes the subject matter of any of Examples A69-71, and further specifies that the audiovisual apparatus is a karaoke unit.

Example A73 includes the subject matter of any of Examples A54-63, and further specifies that the audiovisual apparatus includes a musical instrument, and the lighting device is included in the musical instrument.

Example A74 includes the subject matter of Example A73, and further specifies that the lighting device includes a strip of light-emitting diodes.

Example A75 includes the subject matter of any of Examples A73-74, and further specifies that the PWM circuitry is to change the PWM output with changes in signals output by the musical instrument.

Example A76 includes the subject matter of any of Examples A54-75, and further specifies that the lighting device is part of a light organ.

Example A77 includes the subject matter of Example A76, and further specifies that the PWM output of the PWM circuitry is to change in response to audio data received at the node transceiver via the link of the two-wire bus.

Example A78 includes the subject matter of any of Examples A54-77, and further specifies that the PWM output of the PWM circuitry is to change in response to audio data received at the node transceiver via the link of the two-wire bus.

Example A79 includes the subject matter of Example A78, and further includes: audio output circuitry to provide the audio data to a speaker.

Example A80 includes the subject matter of Example A79, and further specifies that the audio output circuitry is further to output a sound effect to the speaker based on an accelerometer signal.

Example A81 includes the subject matter of Example A80, and further specifies that the accelerometer signal is provided to the node transceiver via the link of the two-wire bus.

Example A82 includes the subject matter of any of Examples A54-81, and further specifies that the node transceiver is to transmit link synchronization information over the two-wire bus in a frame of data.

Example A83 includes the subject matter of any of Examples A54-82, and further specifies that the transceiver circuitry is upstream transceiver circuitry, and the link of the two-wire bus is an upstream link of a two-wire bus.

Example A84 includes the subject matter of Example A83, and further specifies that the node transceiver further includes: downstream transceiver circuitry to couple to a downstream link of a two-wire bus.

Example A85 includes the subject matter of any of Examples A54-82, and further specifies that the transceiver circuitry is downstream transceiver circuitry, and the link of the two-wire bus is a downstream link of a two-wire bus.

Example A86 includes the subject matter of Example A85, and further specifies that the node transceiver further includes: upstream transceiver circuitry to couple to an upstream link of a two-wire bus.

Example A87 is a system in which lighting device control information and audio data is provided over a bus to cause lighting devices to coordinate their outputs with the output audio data.

Example A88 is a method of coordinating lighting device output with audio device output.

Example A89 is a microphone including lighting devices whose outputs may be controlled to be coordinated with audio signals received at the microphone.

Example A90 is a microphone including an accelerometer, wherein the microphone may be communicatively coupled to a bus system so that data from the accelerometer is processed by a processing device of the bus system to trigger sound effects to be output by audio output devices of the bus system.

Example B1 is a node transceiver, including: a node transceiver, wherein the node transceiver includes transceiver circuitry to couple to a link of a two-wire bus; and lighting control circuitry to provide a lighting control output to a peripheral device, and operational characteristics of the lighting control circuitry are programmable by signals received via the transceiver circuitry.

Example B2 includes the subject matter of Example B1, and further specifies that the operational characteristics include a duty cycle of the lighting control output.

Example B3 includes the subject matter of any of Examples B1-2, and further specifies that the operational characteristics include a blink rate of the lighting control output.

Example B4 includes the subject matter of any of Examples B1-3, and further specifies that the operational characteristics include a random frequency hopping of the lighting control output.

Example B5 includes the subject matter of any of Examples B1-4, and further specifies that the lighting control output includes a plurality of lighting control outputs.

Example B6 includes the subject matter of Example B5, and further specifies that the operational characteristics include a phase shift between individual ones of the plurality of lighting control outputs.

Example B7 includes the subject matter of any of Examples B1-6, and further specifies that the node transceiver is included in a vehicle.

Example B8 includes the subject matter of Example B7, and further specifies that the node transceiver is to control a light-emitting diode in the vehicle.

Example B9 includes the subject matter of any of Examples B1-6, and further specifies that the node transceiver is included in a microphone.

Example B10 includes the subject matter of any of Examples B1-6, and further specifies that the node transceiver is included in a musical instrument.

Example B11 includes the subject matter of any of Examples B1-10, and further specifies that the node transceiver is to control a light organ.

Example B12 includes the subject matter of any of Examples B1-11, and further specifies that the lighting control output of the lighting control circuitry is to change in response to audio data received at the node transceiver via the link of the two-wire bus.

Example B13 includes the subject matter of Example B12, and further includes: audio output circuitry to provide the audio data to a speaker.

Example B14 includes the subject matter of Example B13, and further specifies that the audio output circuitry is further to output a sound effect to the speaker based on an accelerometer signal.

Example B15 includes the subject matter of Example B14, and further specifies that the accelerometer signal is provided to the node transceiver via the link of the two-wire bus.

Example B16 includes the subject matter of any of Examples B1-15, and further specifies that the node transceiver is to transmit link synchronization information over the two-wire bus in a frame of data.

Example B17 includes the subject matter of any of Examples B1-16, and further specifies that the transceiver circuitry is upstream transceiver circuitry, and the link of the two-wire bus is an upstream link of a two-wire bus.

Example B18 includes the subject matter of Example B17, and further specifies that the node transceiver further includes: downstream transceiver circuitry to couple to a downstream link of a two-wire bus.

Example B19 includes the subject matter of any of Examples B1-16, and further specifies that the transceiver circuitry is downstream transceiver circuitry, and the link of the two-wire bus is a downstream link of a two-wire bus.

Example B20 includes the subject matter of Example B19, and further specifies that the node transceiver further includes: upstream transceiver circuitry to couple to an upstream link of a two-wire bus.

Example B21 is a lighted apparatus, including: a node transceiver, wherein the node transceiver includes transceiver circuitry to couple to a link of a two-wire bus, and the node transceiver further includes lighting control circuitry; and a lighting device coupled to the node transceiver, wherein the lighting control circuitry is to provide a lighting control output to the lighting device.

Example B22 includes the subject matter of Example B21, and further specifies that the lighting device includes a light-emitting diode.

Example B23 includes the subject matter of any of Examples B21-22, and further specifies that the lighting device includes a plurality of light-emitting diodes.

Example B24 includes the subject matter of any of Examples B21-23, and further specifies that the lighting device includes a strip of light-emitting diodes.

Example B25 includes the subject matter of any of Examples B21-24, and further specifies that operational characteristics of the lighting control circuitry are programmable by signals received via the transceiver circuitry.

Example B26 includes the subject matter of Example B25, and further specifies that the operational characteristics include a duty cycle of the lighting control output.

Example B27 includes the subject matter of any of Examples B25-26, and further specifies that the operational characteristics include a blink rate of the lighting control output.

Example B28 includes the subject matter of any of Examples B25-27, and further specifies that the operational characteristics include a random frequency hopping of the lighting control output.

Example B29 includes the subject matter of any of Examples B25-28, and further specifies that the lighting control output includes a plurality of lighting control outputs.

Example B30 includes the subject matter of Example B29, and further specifies that the operational characteristics include a phase shift between individual ones of the plurality of lighting control outputs.

Example B31 includes the subject matter of any of Examples B21-30, and further specifies that the lighted apparatus is a vehicle.

Example B32 includes the subject matter of Example B31, and further specifies that the lighting device is in an instrument panel of the vehicle.

Example B33 includes the subject matter of Example B31, and further specifies that the lighting device is near a footwell of the vehicle.

Example B34 includes the subject matter of Example B31, and further specifies that the lighting device is a reading light in the vehicle.

Example B35 includes the subject matter of Example B31, and further specifies that the lighting device is in a cabin of the vehicle.

Example B36 includes the subject matter of any of Examples B21-30, and further specifies that the lighted apparatus includes a microphone, and the lighting device is included in the microphone.

Example B37 includes the subject matter of Example B36, and further specifies that the lighting device includes a strip of light-emitting diodes.

Example B38 includes the subject matter of any of Examples B36-37, and further specifies that the lighting control circuitry is to change the lighting control output with changes in sound detected by the microphone.

Example B39 includes the subject matter of any of Examples B36-38, and further specifies that the lighted apparatus is a karaoke unit.

Example B40 includes the subject matter of any of Examples B21-30, and further specifies that the lighted apparatus includes a musical instrument, and the lighting device is included in the musical instrument.

Example B41 includes the subject matter of Example B40, and further specifies that the lighting device includes a strip of light-emitting diodes.

Example B42 includes the subject matter of any of Examples B40-41, and further specifies that the lighting control circuitry is to change the lighting control output with changes in signals output by the musical instrument.

Example B43 includes the subject matter of any of Examples B21-42, and further specifies that the lighting device is part of a light organ.

Example B44 includes the subject matter of Example B43, and further specifies that the lighting control output of the lighting control circuitry is to change in response to audio data received at the node transceiver via the link of the two-wire bus.

Example B45 includes the subject matter of any of Examples B21-44, and further specifies that the lighting control output of the lighting control circuitry is to change in response to audio data received at the node transceiver via the link of the two-wire bus.

Example B46 includes the subject matter of Example B45, and further includes: audio output circuitry to provide the audio data to a speaker.

Example B47 includes the subject matter of Example B46, and further specifies that the audio output circuitry is further to output a sound effect to the speaker based on an accelerometer signal.

Example B48 includes the subject matter of Example B47, and further specifies that the accelerometer signal is provided to the node transceiver via the link of the two-wire bus.

Example B49 includes the subject matter of any of Examples B21-48, and further specifies that the node transceiver is to transmit link synchronization information over the two-wire bus in a frame of data.

Example B50 includes the subject matter of any of Examples B21-49, and further specifies that the transceiver circuitry is upstream transceiver circuitry, and the link of the two-wire bus is an upstream link of a two-wire bus.

Example B51 includes the subject matter of Example B50, and further specifies that the node transceiver further includes: downstream transceiver circuitry to couple to a downstream link of a two-wire bus.

Example B52 includes the subject matter of any of Examples B21-49, and further specifies that the transceiver circuitry is downstream transceiver circuitry, and the link of the two-wire bus is a downstream link of a two-wire bus.

Example B53 includes the subject matter of Example B52, and further specifies that the node transceiver further includes: upstream transceiver circuitry to couple to an upstream link of a two-wire bus.

Example B54 is an audiovisual apparatus, including: a node transceiver, wherein the node transceiver includes transceiver circuitry to couple to a link of a two-wire bus, and the node transceiver further includes lighting control circuitry; a lighting device coupled to the node transceiver, wherein the lighting control circuitry is to provide a lighting control output to the lighting device; and a speaker coupled to the node transceiver, wherein the speaker is to output audio data received by the transceiver circuitry via the link of the two-wire bus.

Example B55 includes the subject matter of Example B54, and further specifies that the lighting device includes a light-emitting diode.

Example B56 includes the subject matter of any of Examples B54-55, and further specifies that the lighting device includes a plurality of light-emitting diodes.

Example B57 includes the subject matter of any of Examples B54-56, and further specifies that the lighting device includes a strip of light-emitting diodes.

Example B58 includes the subject matter of any of Examples B54-57, and further specifies that operational characteristics of the lighting control circuitry are programmable by signals received via the transceiver circuitry.

Example B59 includes the subject matter of Example B58, and further specifies that the operational characteristics include a duty cycle of the lighting control output.

Example B60 includes the subject matter of any of Examples B58-59, and further specifies that the operational characteristics include a blink rate of the lighting control output.

Example B61 includes the subject matter of any of Examples B58-60, and further specifies that the operational characteristics include a random frequency hopping of the lighting control output.

Example B62 includes the subject matter of any of Examples B58-61, and further specifies that the lighting control output includes a plurality of lighting control outputs.

Example B63 includes the subject matter of Example B62, and further specifies that the operational characteristics include a phase shift between individual ones of the plurality of lighting control outputs.

Example B64 includes the subject matter of any of Examples B54-63, and further specifies that the audiovisual apparatus is a vehicle.

Example B65 includes the subject matter of Example B64, and further specifies that the lighting device is in an instrument panel of the vehicle.

Example B66 includes the subject matter of Example B64, and further specifies that the lighting device is near a footwell of the vehicle.

Example B67 includes the subject matter of Example B64, and further specifies that the lighting device is a reading light in the vehicle.

Example B68 includes the subject matter of Example B64, and further specifies that the lighting device is in a cabin of the vehicle.

Example B69 includes the subject matter of any of Examples B54-68, and further specifies that the audio data originates from a microphone coupled to another node transceiver on the two-wire bus.

Example B70 includes the subject matter of Example B69, and further specifies that the microphone includes a plurality of microphones.

Example B71 includes the subject matter of any of Examples B69-70, and further specifies that the lighting control circuitry is to change the lighting control output with changes in sound detected by the microphone.

Example B72 includes the subject matter of any of Examples B69-71, and further specifies that the audiovisual apparatus is a karaoke unit.

Example B73 includes the subject matter of any of Examples B54-63, and further specifies that the audiovisual apparatus includes a musical instrument, and the lighting device is included in the musical instrument.

Example B74 includes the subject matter of Example B73, and further specifies that the lighting device includes a strip of light-emitting diodes.

Example B75 includes the subject matter of any of Examples B73-74, and further specifies that the lighting control circuitry is to change the lighting control output with changes in signals output by the musical instrument.

Example B76 includes the subject matter of any of Examples B54-75, and further specifies that the lighting device is part of a light organ.

Example B77 includes the subject matter of Example B76, and further specifies that the lighting control output of the lighting control circuitry is to change in response to audio data received at the node transceiver via the link of the two-wire bus.

Example B78 includes the subject matter of any of Examples B54-77, and further specifies that the lighting control output of the lighting control circuitry is to change in response to audio data received at the node transceiver via the link of the two-wire bus.

Example B79 includes the subject matter of Example B78, and further includes: audio output circuitry to provide the audio data to a speaker.

Example B80 includes the subject matter of Example B79, and further specifies that the audio output circuitry is further to output a sound effect to the speaker based on an accelerometer signal.

Example B81 includes the subject matter of Example B80, and further specifies that the accelerometer signal is provided to the node transceiver via the link of the two-wire bus.

Example B82 includes the subject matter of any of Examples B54-81, and further specifies that the node transceiver is to transmit link synchronization information over the two-wire bus in a frame of data.

Example B83 includes the subject matter of any of Examples B54-82, and further specifies that the transceiver circuitry is upstream transceiver circuitry, and the link of the two-wire bus is an upstream link of a two-wire bus.

Example B84 includes the subject matter of Example B83, and further specifies that the node transceiver further includes: downstream transceiver circuitry to couple to a downstream link of a two-wire bus.

Example B85 includes the subject matter of any of Examples B54-82, and further specifies that the transceiver circuitry is downstream transceiver circuitry, and the link of the two-wire bus is a downstream link of a two-wire bus.

Example B86 includes the subject matter of Example B85, and further specifies that the node transceiver further includes: upstream transceiver circuitry to couple to an upstream link of a two-wire bus.

The invention claimed is:
1. A node transceiver, comprising:
   a node transceiver, wherein the node transceiver includes transceiver circuitry to couple to a link of a two-wire bus; and
   pulse width modulation (PWM) circuitry to provide a PWM output to a peripheral device, and operational characteristics of the PWM circuitry are programmable by signals received via the transceiver circuitry,
   wherein the PWM output of the PWM circuitry is to change in response to audio data received at the node transceiver via the link of the two-wire bus.

2. The node transceiver of claim 1, wherein the operational characteristics include a duty cycle of the PWM output.

3. The node transceiver of claim 1, wherein the operational characteristics include a random frequency hopping of the PWM output.

4. The node transceiver of claim 1, wherein the PWM output includes a plurality of PWM outputs.

5. The node transceiver of claim 4, wherein the operational characteristics include a phase shift between individual ones of the plurality of PWM outputs.

6. The node transceiver of claim 1, further comprising audio output circuitry to provide the audio data to a speaker.

7. A lighted apparatus, comprising:
   a node transceiver, wherein the node transceiver includes transceiver circuitry to couple to a link of a two-wire bus, and the node transceiver further includes lighting control circuitry; and
   a lighting device coupled to the node transceiver, wherein the lighting control circuitry is to provide a lighting control output to the lighting device
   wherein the lighting control output of the lighting control circuitry is to change in response to audio data received at the node transceiver via the link of the two-wire bus.

8. The lighted apparatus of claim 7, wherein the lighting device includes a light-emitting diode.

9. The lighted apparatus of claim 7, wherein the lighted apparatus is a vehicle.

10. The lighted apparatus of claim 9, wherein the lighting device is in a cabin of the vehicle.

11. The lighted apparatus of claim 7, wherein the lighted apparatus includes a microphone, and the lighting device is included in the microphone.

12. The lighted apparatus of claim 11, wherein the lighting control circuitry is to change the lighting control output with changes in sound detected by the microphone.

13. The lighted apparatus of claim 11, wherein the lighted apparatus is a karaoke unit.

14. The lighted apparatus of claim 7, wherein the lighted apparatus includes a musical instrument, and the lighting device is included in the musical instrument.

15. The lighted apparatus of claim 14, wherein the lighting control circuitry is to change the lighting control output with changes in signals output by the musical instrument.

16. An audiovisual apparatus, comprising:
a node transceiver, wherein the node transceiver includes transceiver circuitry to couple to a link of a two-wire bus, and the node transceiver further includes pulse width modulation (PWM) circuitry;
a lighting device coupled to the node transceiver, wherein the PWM circuitry is to provide a PWM output to the lighting device; and
a speaker coupled to the node transceiver, wherein the speaker is to output audio data received by the transceiver circuitry via the link of the two-wire bus wherein the PWM output of the PWM circuitry is to change in response to the audio data.

17. The audiovisual apparatus of claim 16, wherein the audio data originates from a microphone coupled to another node transceiver on the two-wire bus.

18. The audiovisual apparatus of claim 16, further comprising:
audio output circuitry to provide the audio data to a speaker, wherein the audio output circuitry is further to output a sound effect to the speaker based on an accelerometer signal.

19. The audiovisual apparatus of claim 16, wherein the node transceiver is to transmit link synchronization information over the two-wire bus in a frame of data.

20. The audiovisual apparatus of claim 16, wherein the audio data originates from a microphone coupled to another node transceiver on the two-wire bus.

* * * * *